(12) United States Patent
Sakmar

(10) Patent No.: US 10,095,001 B2
(45) Date of Patent: Oct. 9, 2018

(54) SPRING ASSIST CABLE CLAMPS

(71) Applicant: Hubbell Incorporated, Shelton, CT (US)

(72) Inventor: John Edward Sakmar, Birmingham, AL (US)

(73) Assignee: Hubbell Incorporated, Shelton, CT (US)

( * ) Notice: Subject to any disclaimer, the term of this patent is extended or adjusted under 35 U.S.C. 154(b) by 0 days.

(21) Appl. No.: 15/663,051

(22) Filed: Jul. 28, 2017

(65) Prior Publication Data

US 2018/0031794 A1 Feb. 1, 2018

Related U.S. Application Data

(60) Provisional application No. 62/368,450, filed on Jul. 29, 2016.

(51) Int. Cl.
| | |
|---|---|
| G02B 6/48 | (2006.01) |
| G02B 6/44 | (2006.01) |
| H02G 7/08 | (2006.01) |
| H02G 3/32 | (2006.01) |
| G02B 6/38 | (2006.01) |

(52) U.S. Cl.
CPC .............. *G02B 6/48* (2013.01); *G02B 6/4429* (2013.01); *G02B 6/4463* (2013.01); *H02G 3/32* (2013.01); *H02G 7/08* (2013.01); *G02B 6/3887* (2013.01); *G02B 6/4471* (2013.01)

(58) Field of Classification Search
None
See application file for complete search history.

(56) References Cited

U.S. PATENT DOCUMENTS

| | | |
|---|---|---|
| 1,489,835 A | 4/1924 | Kietz |
| 1,603,035 A | 10/1926 | Evans |
| 2,120,447 A | 3/1935 | Tipsord |
| 2,107,061 A | 1/1937 | Pittman et al. |
| 2,206,653 A | 10/1939 | Yonkers |
| 2,397,390 A | 3/1946 | Wadsworth |
| 2,530,299 A | 7/1947 | Hendley |
| 2,574,796 A | 11/1951 | Moore |
| 2,651,766 A | 9/1953 | Runde |
| 2,811,703 A | 10/1957 | Becker |
| 2,867,787 A | 3/1958 | Nilsson |
| 3,036,286 A | 3/1960 | Gorc et al. |
| 2,958,067 A | 10/1960 | Hardy |
| 3,075,166 A | 1/1963 | Peek |
| 3,132,914 A | 5/1964 | Wengen |

(Continued)

FOREIGN PATENT DOCUMENTS

| | | |
|---|---|---|
| JP | 08308071 | 11/1996 |
| JP | 10042438 | 2/1998 |
| JP | 2001136643 | 5/2001 |

OTHER PUBLICATIONS

International Search Report and Written Opinion mailed in International Application PCT/US17/44402 dated Oct. 6, 2017.

(Continued)

*Primary Examiner* — Jerry Rahll
(74) *Attorney, Agent, or Firm* — Wissing Miller LLP

(57) ABSTRACT

Cable clamps configured to be installed from the ground with an extendable reach tool, such as a hot stick, are provided. Initial spring tension temporarily holds a drop cable in a drop cable section of the clamp, and a main span cable can be guided into a main span section of the clamp and tightened.

20 Claims, 24 Drawing Sheets

(56) References Cited

U.S. PATENT DOCUMENTS

| | | |
|---|---|---|
| 3,142,535 A | 7/1964 | Roosman |
| 3,177,459 A | 4/1965 | Burch |
| 3,614,700 A | 10/1971 | Beard et al. |
| 3,830,427 A | 8/1974 | Polidori |
| 3,923,363 A | 12/1975 | Kraft |
| 4,183,686 A | 1/1980 | De France |
| 4,293,176 A | 10/1981 | Linklof |
| 4,600,264 A | 7/1986 | Counsel |
| 4,707,051 A | 11/1987 | Hall |
| 4,836,725 A | 7/1989 | Williams et al. |
| 5,004,437 A | 4/1991 | Walter et al. |
| 5,021,014 A | 6/1991 | Walter et al. |
| D329,244 S | 9/1992 | Saito et al. |
| 5,369,849 A | 12/1994 | De France |
| 5,440,665 A | 8/1995 | Ray |
| 5,539,961 A | 7/1996 | DeFrance |
| 5,547,404 A | 8/1996 | Nellis, Jr. et al. |
| 5,692,930 A | 12/1997 | Garver et al. |
| 6,371,419 B1 | 4/2002 | Ohnuki |
| 6,390,861 B1 | 5/2002 | DeFrance |
| 6,595,472 B1 | 7/2003 | Pisczak |
| 6,732,981 B2 | 5/2004 | Franks |
| 7,029,316 B2 | 4/2006 | Jackson, III |
| 7,066,024 B2 | 6/2006 | Watchel |
| 7,160,142 B2 | 1/2007 | Hughes et al. |
| 8,152,070 B2 | 4/2012 | Al-Hussein et al. |
| 8,672,716 B2 | 3/2014 | DeFrance |
| 2002/0142674 A1 | 10/2002 | Chadbourne et al. |
| 2013/0303035 A1 | 11/2013 | Neal et al. |

OTHER PUBLICATIONS

Hubbell Brochure "Overhead Primary Taps Hot Line Tap Clamps Aluminum", Dec. 2014 (32 pages).
Fargo Brochure "GH-700A", Jan. 1995 (2 pages).
Burndy Fastap Introduction Sheet 2014.
Burndy Fastap Installation Instructions 2014.
International Search Report and Written Opinion mailed in International Application PCT/US17/44496 dated Oct. 12, 2017 (7 pages).

SPRING ASSIST CABLE CLAMPS

CROSS REFERENCE TO RELATED APPLICATIONS

The present application is based on and claims benefit from U.S. Provisional Application Ser. No. 62/368,450 filed Jul. 29, 2016 entitled "Spring Assist Cable Clamps" the entire contents of which are incorporated herein by reference.

BACKGROUND

Field

The present disclosure relates generally to clamps for utility cabling and more particularly to cable clamps for clamping drop cables to main span cables, or tap conductors to main span conductors.

Description of the Related Art

Aerial cabling, such as high tension electrical power conductors or fiber optic cabling for communications, data or media transmission is typically strung from utility pole to utility pole, or from a utility pole to a building. The electrical power conductor or fiber optic cabling between utility poles is often referred to as a main span conductor or cable.

With aerial electrical power conductors, when power is to be supplied to an auxiliary source or transferred around a pole with dead-ends on each side of the pole, connections with the power conductors are typically made in close proximity to the utility pole or building. Examples of auxiliary sources include transformers, switches, cutouts, arresters, etc. Tap conductors are used to supply power from the electrical power conductors to an auxiliary source, and jumper connections are used to transfer power around a pole with dead-ends on each side. In either case, a tap clamp is used to clamp the tap conductors or jumpers to the main span conductor.

With aerial fiber optic cabling, connections between fiber optic cables are typically made in close proximity to the utility pole or building. However, there are instances where mid-span drop connections are needed. In this sense, mid-span drops are cable connections between a main span fiber optic cable and a fiber optic drop cable at a point along the main span cable away from the utility pole, often at or near a mid-point of the main span cable. To withstand cable sag and environmental conditions, lashed fiber optic cables are used for the main span cable. Lashed fiber optic cable uses a galvanized steel support wire to which the fiber optic cable is affixed or lashed. Mid-span drops can be achieved on lashed aerial cable using a bolted cable clamp with a hook. The cable clamp is bolted to the galvanized steel support wire that the fiber optic cable is lashed to, and then a dead-end of the drop cable is attached to the hook to hold the drop cable in place relative to the main span cable. In instances where a bucket truck can be used to install a mid-span drop cable, a technician (or lineman) would bolt a cable clamp to the galvanized steel support wire while standing in the bucket. In instances where a bucket truck cannot be used, a technician would have to clamp the drop cable to the main span cable from the ground using an extendable reach tool, such as a hot stick. However, such bolted cable clamps are not suitable for clamping a drop cable to the main span cable from the ground. As a result, in such instances the clamp has to be configured to be installed from the ground using extendable reach tools, e.g., hot sticks.

Accordingly, a cable clamp capable of clamping a tap conductor to a main span conductor or clamping a fiber optic drop cable to a main span cable from the ground is needed. The present disclosure provides a cable clamp that, for example, can be used for taps or mid-span drops where the cable clamp is to be installed from the ground.

SUMMARY

The cable clamps according to the present disclosure use a spring to provide initial clamping force on a tap conductor or drop cable positioned between a keeper and spacer within the cable clamp. In an exemplary embodiment, the cable clamp includes a clamp body, a spacer, a keeper, a stem and a spring. The clamp body has a cap, a base and wall between the cap and base. The cap, base and wall form a cavity, and the cap includes a first main span cable groove. The spacer has a spacer body movably mounted within the cavity of the clamp body. The spacer body has a hollow center and a top wall with a second main span cable groove that faces the first main span cable groove. The spacer body also has a first drop cable groove. The keeper is positioned within the hollow center of the spacer body and is movable within the hollow center. The keeper has a second drop cable groove that faces the first drop cable groove and a keeper coupling member. The stem has a stem coupling member at one end of a threaded shaft and a tool mounting member at the other end of the threaded shaft. The threaded shaft is positioned within a threaded aperture in the clamp body so that the stem coupling member is coupled to the keeper coupling member such that rotational movement of the stem is translated to linear movement of the keeper. The spring is positioned around the threaded shaft of the stem within the hollow center of the spacer between the keeper and the spacer body. The spring normally biases the second drop cable groove toward the first drop cable groove.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein.

DETAILED DESCRIPTION

Figure 1:
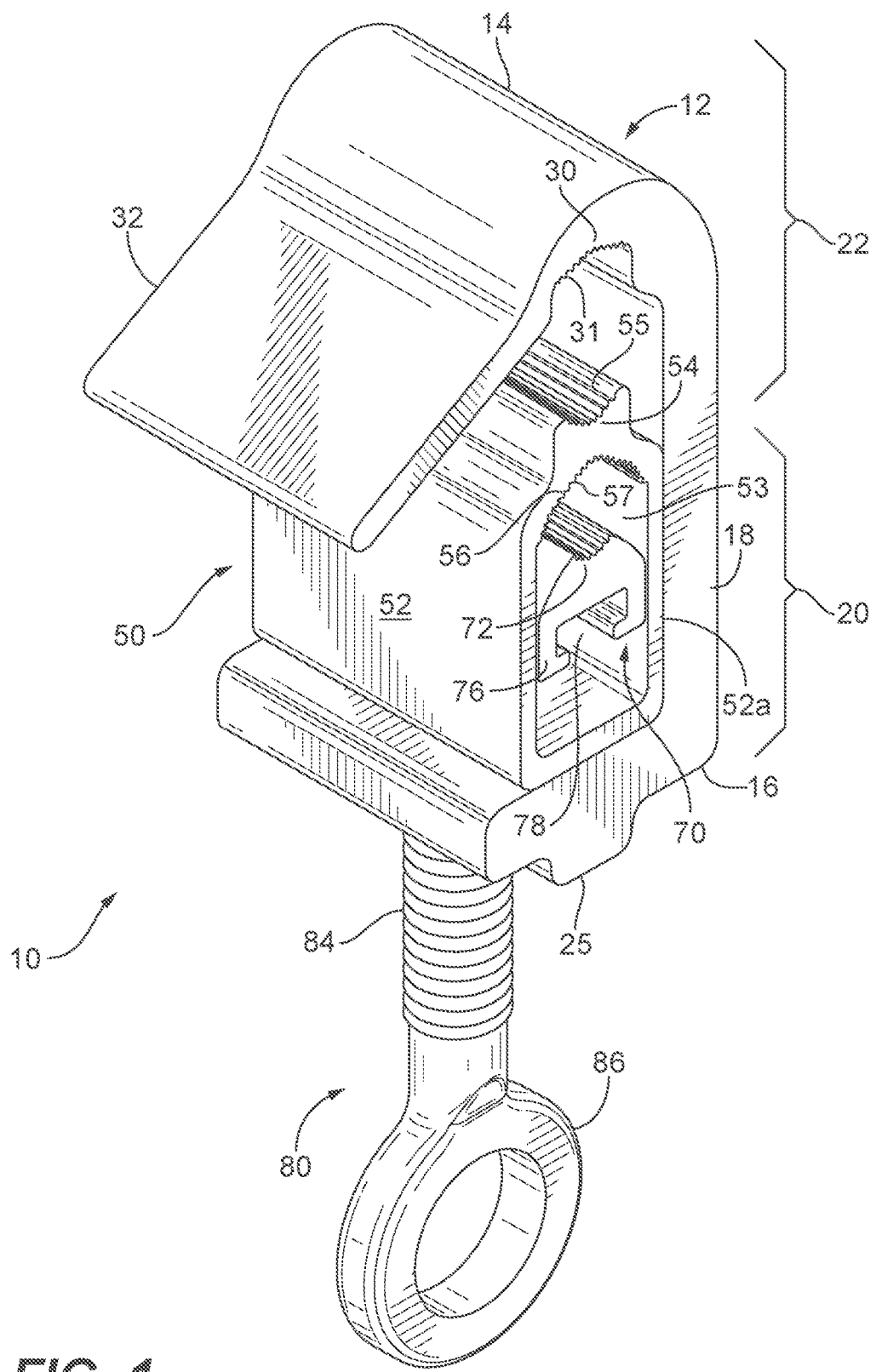
FIG. 1 is a perspective view of an exemplary embodiment of a cable clamp according to the present disclosure, illustrating a main span cable section in an open position and a drop cable section in an open position.

Exemplary embodiments of the cable clamp of the present disclosure are shown and described. For ease of description, the cable clamp described herein may also be referenced as the "clamp." The clamp according to the present disclosure is configured to be installed from the ground with an extendable reach tool, such as for example a hot stick. Initial spring tension temporarily holds a tap conductor or drop cable in a drop cable section of the clamp, and a main span conductor or cable can be guided into a main span section of the clamp and tightened. For the purposes of the present disclosure, the tap conductor and drop cable are referred to as a drop cable. For the purposes of the present disclosure, a main span conductor and main span cable are referred to as a main span cable.

Referring now to the figures, in particular FIGS. 1-8, an exemplary embodiment of the clamp according to the present disclosure is shown. The clamp 10 includes a clamp body 12, a spacer 50, a keeper 70, a stem 80 and a spring 90. The clamp body 12 in this exemplary embodiment is a C-shaped member having cap 14, a base 16 and an intermediate wall 18 between the cap 14 and base 16. The cap 14, base 16 and intermediate wall 18 form the C-shape and define a chamber 19, seen in FIGS. 2, 4 and 6 that receives the spacer 50, keeper 70 and spring 90, as described below. For general reference purposes, the clamp body 12 is split into two sections: a drop cable section 20 and a main span cable section 22.

The cap 14 of the clamp body 12 has a main span cable groove 30 that may include a plurality of teeth 31 on a surface of the main span cable groove 30 facing into the chamber 19. The teeth can be provided to better grip a main span cable inserted into the main span section 22 of the clamp body 12. As the clamp body 12 may be extruded, the teeth 31 may run along the width W of the clamp body 12, seen in FIG. 3. The cap 14 of the clamp body 12 may also include cable guide 32 used to guide a main span cable into the main span cable section 22 of the clamp body 12. The cable guide 32 may be a duck-bill type guide or other shape guide suitable to guide a main span cable into the main span cable section 22 of the clamp body 12. The intermediate wall 18 of the clamp body 12 has an aperture 26, seen in FIG. 4, configured to receive a drive pin 28 that is secured within the aperture 26 by, for example, a press fit. The drive pin 28 extends into the chamber 19 of the clamp body 12. The base 16 of the clamp body 12 has a threaded aperture 24, seen in FIGS. 2 and 5, configured to receive a threaded shaft of the stem 80. The base 16 of the clamp body 12 also has a protruding foot member 25 that may extend along the width W of the base 16, as shown in FIG. 3. In another embodiment, the protruding foot member 25 may be a plurality of protruding foot members 25 spaced apart along the width W of the base 16. The protruding foot member 25 is used when coupling the clamp 10 to, for example, a crown of an extensible reach tool, such as a hot stick, when installing the clamp on a main span cable.

Figure 2:
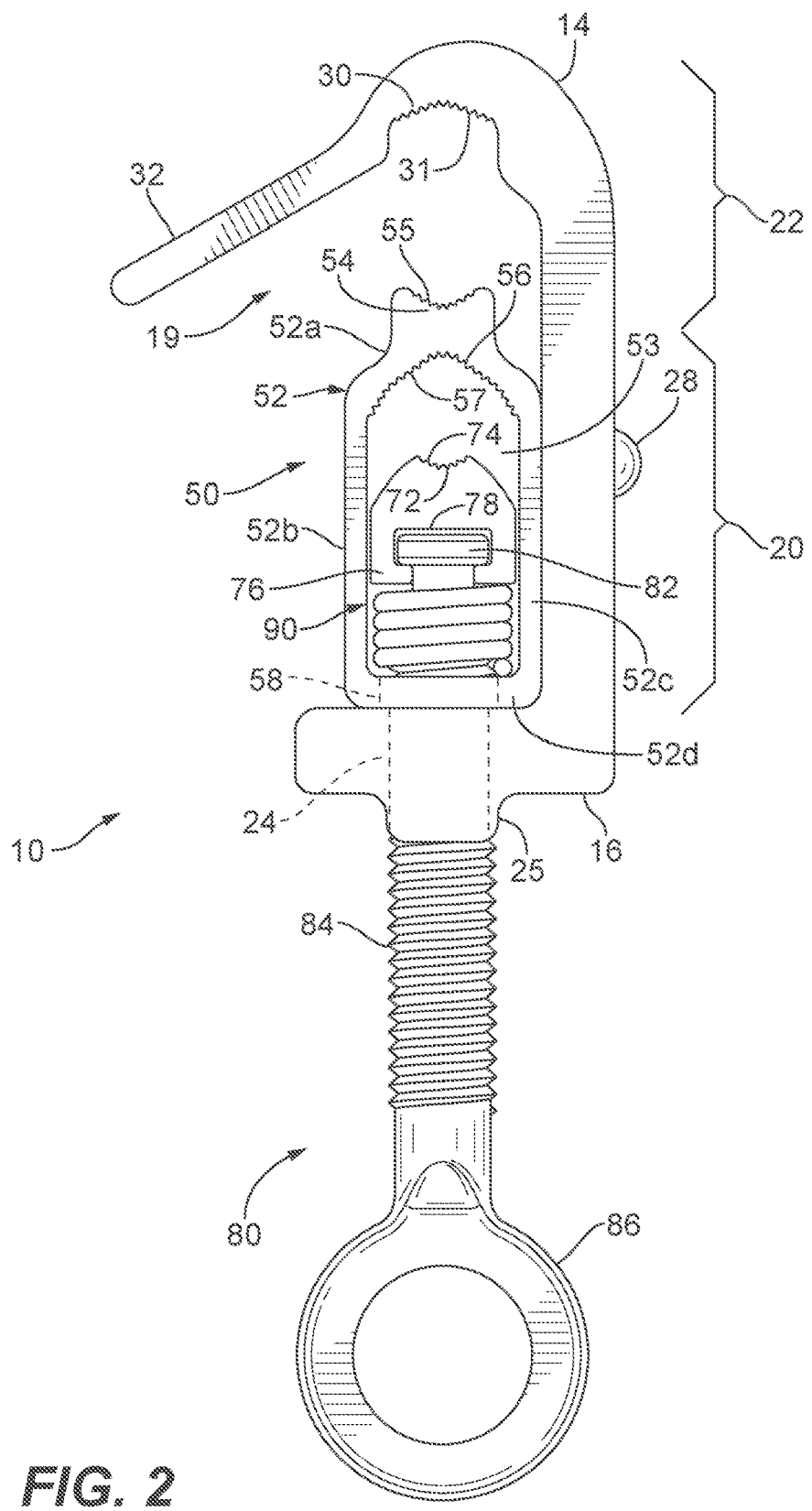
FIG. 2 is a side elevation view of the cable clamp of FIG. 1.
Figure 3:
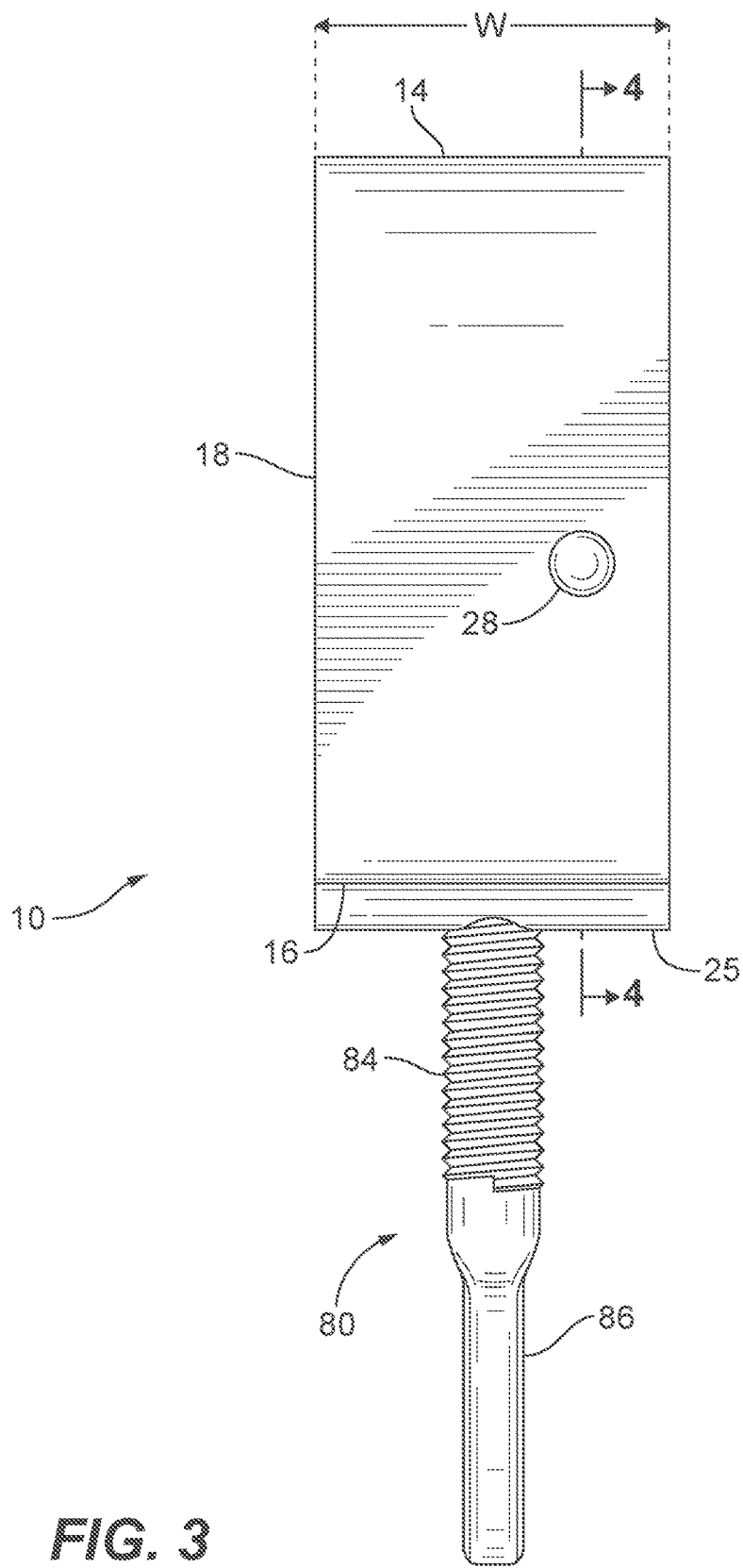
FIG. 3 is a rear elevation view of the cable clamp of FIG. 1.
Figure 4:
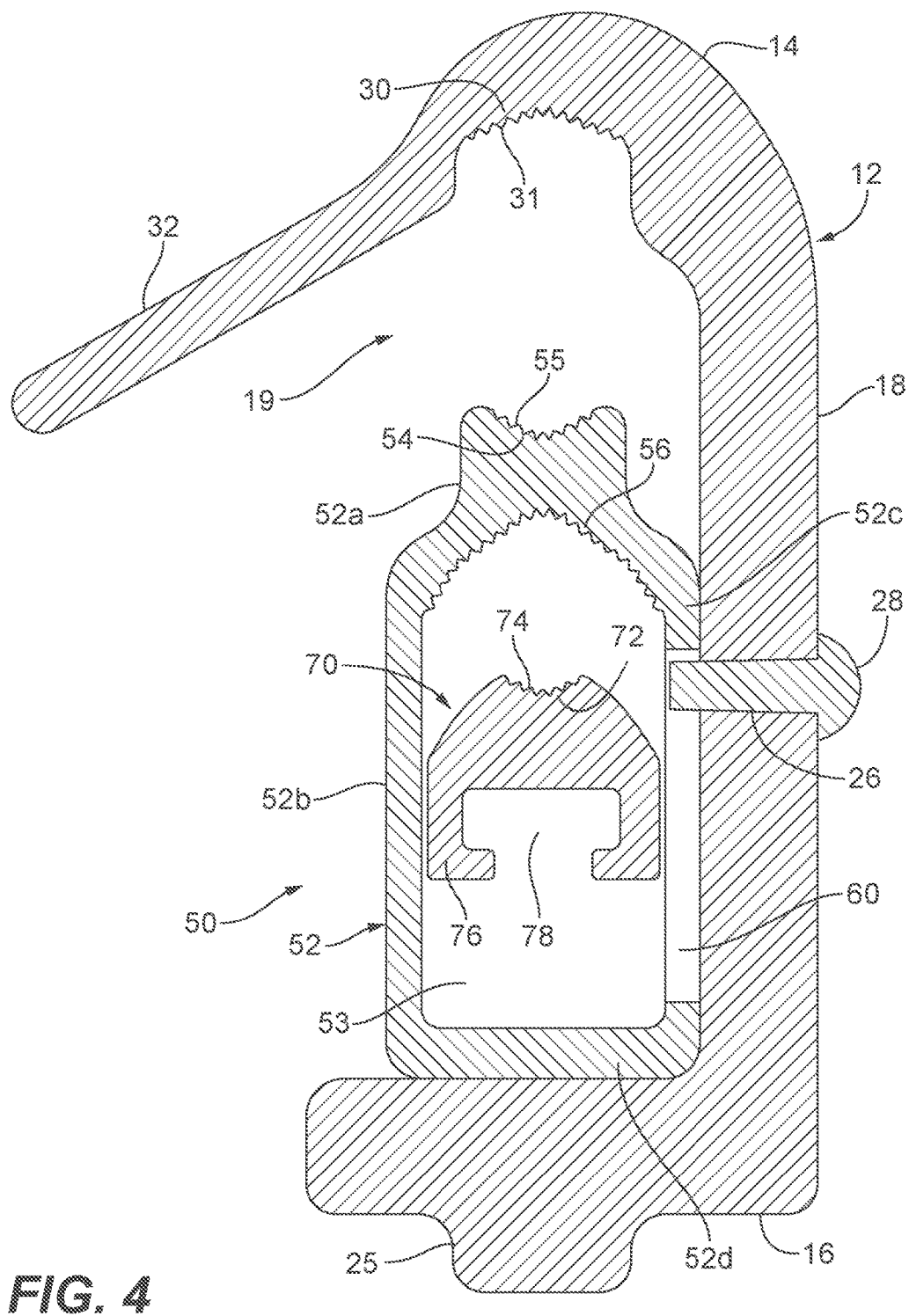
FIG. 4 is a cross sectional view of the cable clamp of FIG. 3 without a stem and taken along line 4-4.
Figure 5:
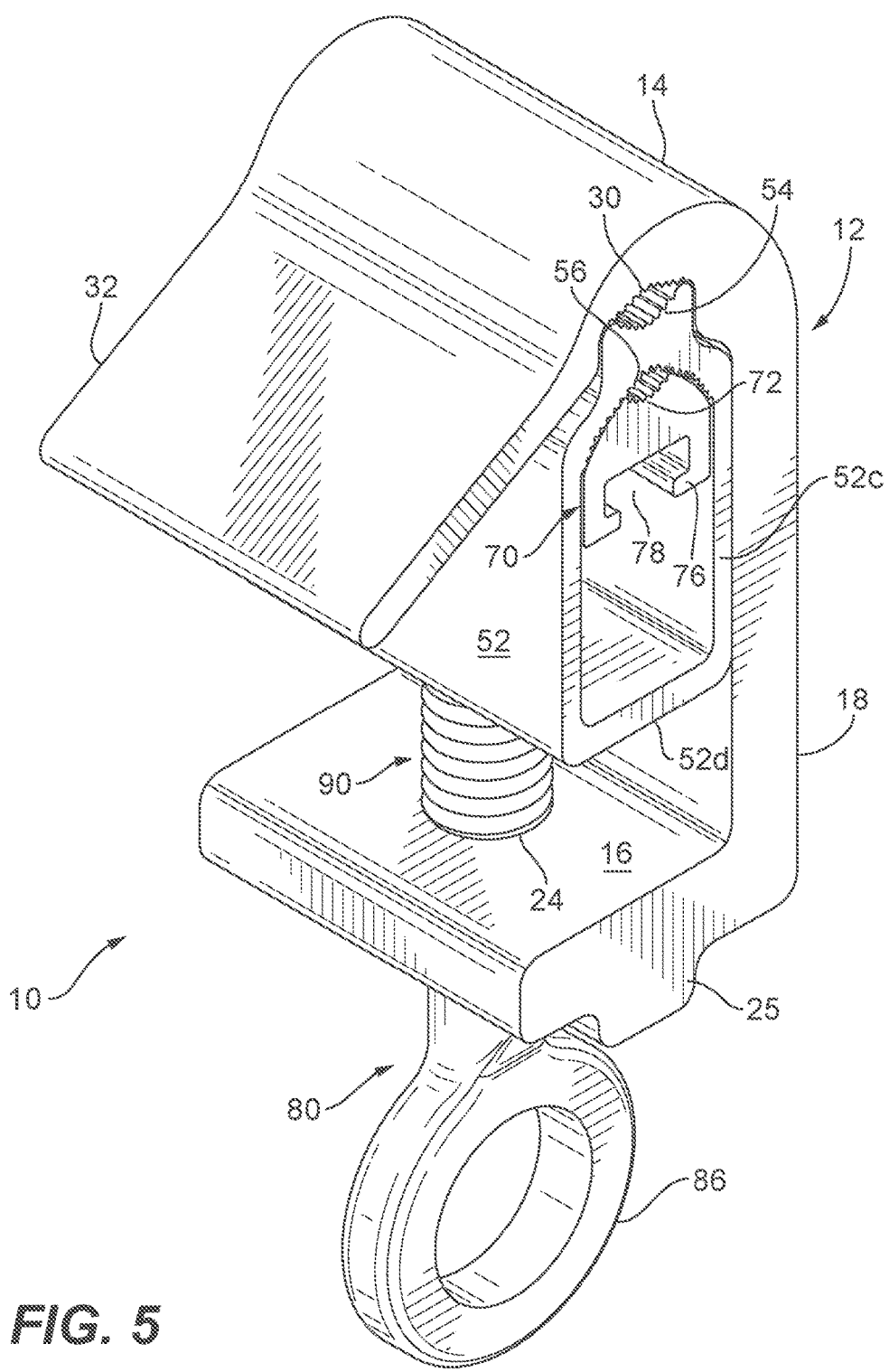
FIG. 5 is a perspective view of the cable clamp of FIG. 1, illustrating the main span cable section in a clamping position without a main span cable and the drop cable section in a clamping position without a drop cable.

Referring to FIGS. 2-4, the spacer 50 has a body 52 that may extend along the width W of the clamp body 12, seen in FIG. 3. However, it should be appreciated that the width of the spacer 50 may be greater than or less than the width W of the clamp body 12. The spacer body 52 has a hollow portion 53 configured to receive the keeper 70 and a portion of the stem 80. The spacer body 52 has a top wall 52a, side walls 52b and 52c, and a bottom wall 52d. The top wall 52a of the spacer body 52 has a main span cable groove 54 and a drop cable groove 56. The main span cable groove 54 faces the main span cable groove 30 in the clamp body 12, and may include a plurality of teeth 55 on a surface of the main span cable groove 54. The teeth 55 can be used to better grip a main span cable inserted into the main span cable section 22 of the clamp body 12. The drop cable groove 56 faces the keeper 70, and may include a plurality of teeth 57 on a surface of the drop cable groove 56. The teeth 57 can be used to better grip a drop cable inserted into the drop cable section 20 of the clamp body 12. As the spacer body 52 may be extruded, the teeth 55 and 57 may run along the width of the spacer body 52. The base 52d of the spacer body 52 has an aperture 58, seen in FIGS. 2 and 6, configured to permit the stem 80 to pass into the hollow portion 53 of the spacer body 52 such that the spacer can move freely relative to the stem. Side wall 52c of the spacer body 52 has a slot 60, seen in FIG. 4, for receiving at least a portion of the drive pin 28.

The slot 60 and drive pin 28 maintain the alignment of the spacer 50 relative to the clamp body 12.

Figure 10:
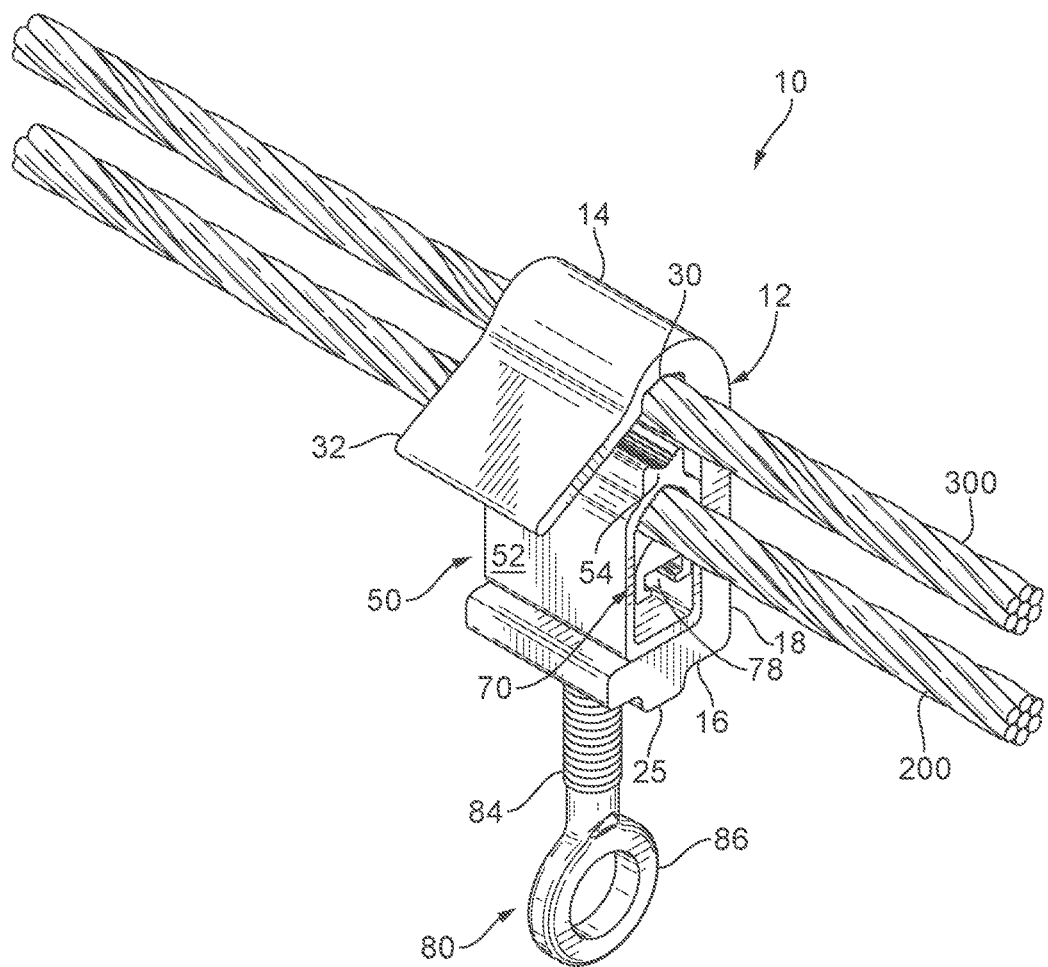
FIG. 10 is a perspective view of the cable clamp of FIG. 9.

The keeper 70 is preferably a solid member configured to fit within the hollow portion 53 of the spacer 50. The keeper 70 has a top portion with a drop cable groove 72 that faces the drop cable groove 56 in the spacer 50, and may include a plurality of teeth 74 on a surface of the drop cable groove 56. The teeth 74 can be used to better grip a drop cable inserted into the drop cable section 20 of the clamp body 12, which is between the spacer 50 and the keeper 70. The keeper 70 has a bottom portion 76 with a coupling member 78. In the embodiment shown, the coupling member 78 is a T-shaped channel, as shown in FIG. 4. The keeper 70 is movable within the hollow portion 53 of the spacer body 52 between an open position, seen in FIGS. 2 and 4, where a drop cable can be received between the spacer drop cable groove 56 and the keeper drop cable groove 72, and a clamping position, seen in FIGS. 6, 10 and 12, where a drop cable is clamped between the spacer drop cable groove 56 and the keeper drop cable groove 72.

Figure 6:
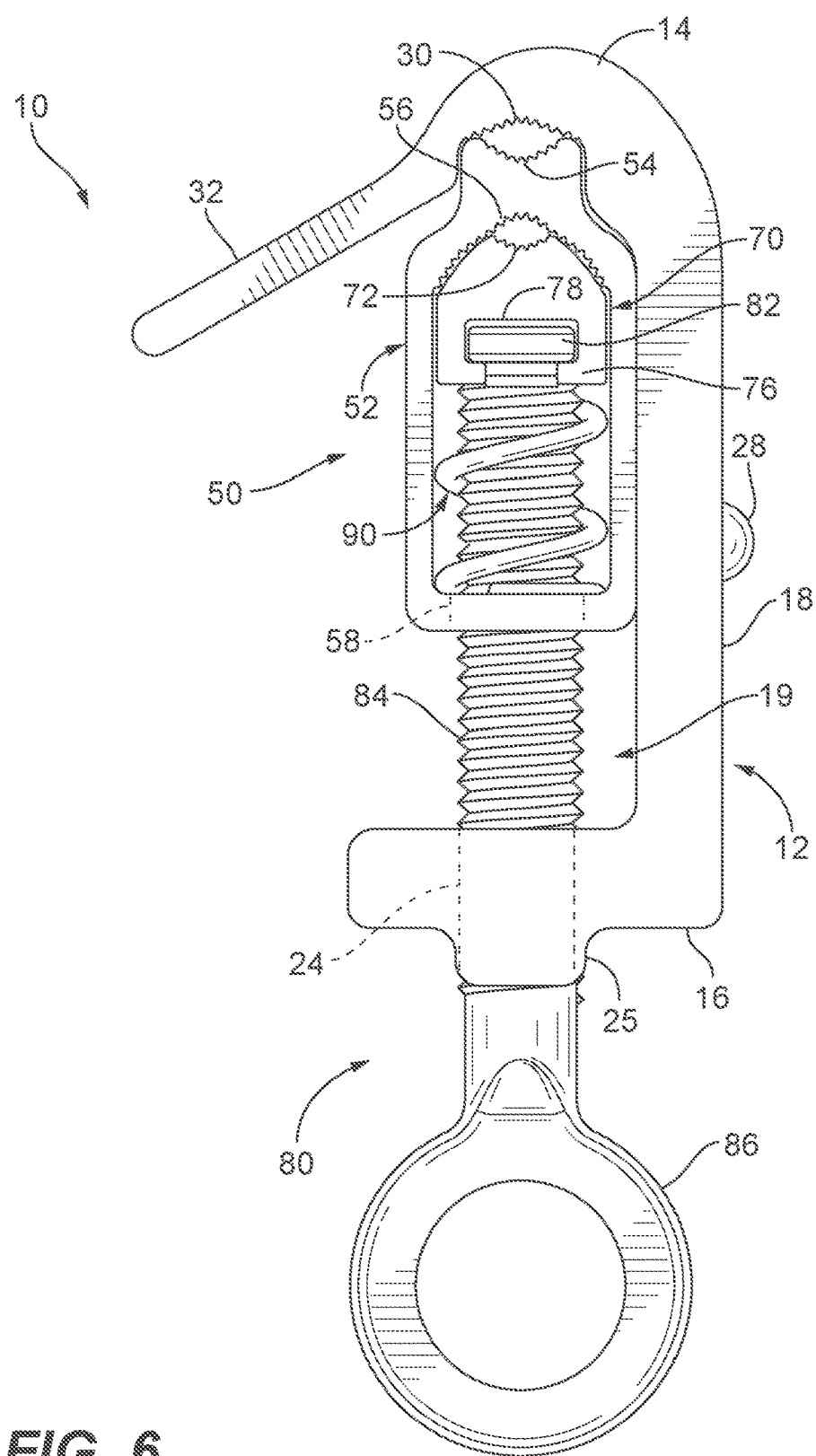
FIG. 6 is side elevation view of the cable clamp of FIG. 5.
Figure 7:
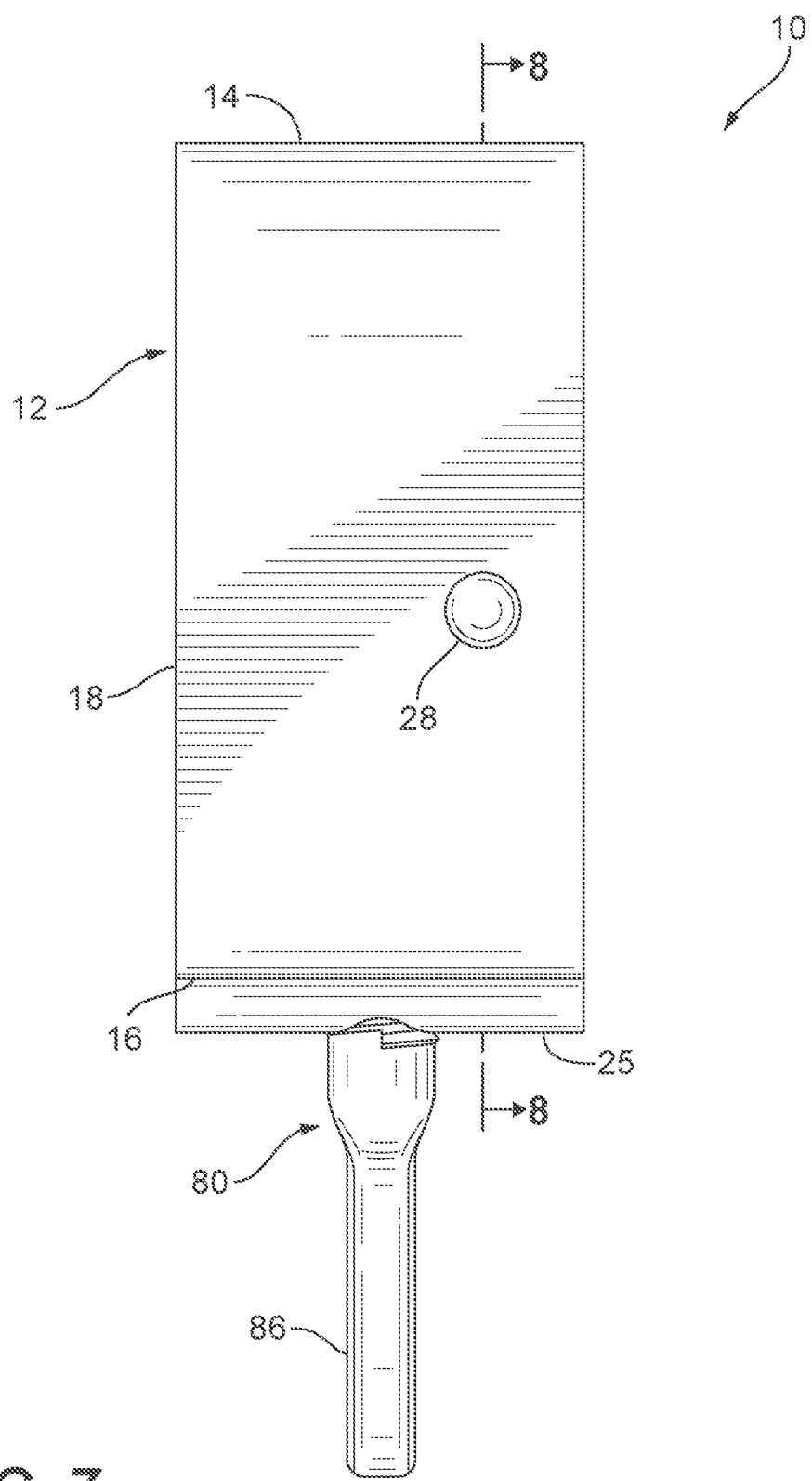
FIG. 7 is a rear elevation view of the cable clamp of FIG. 5.
Figure 8:
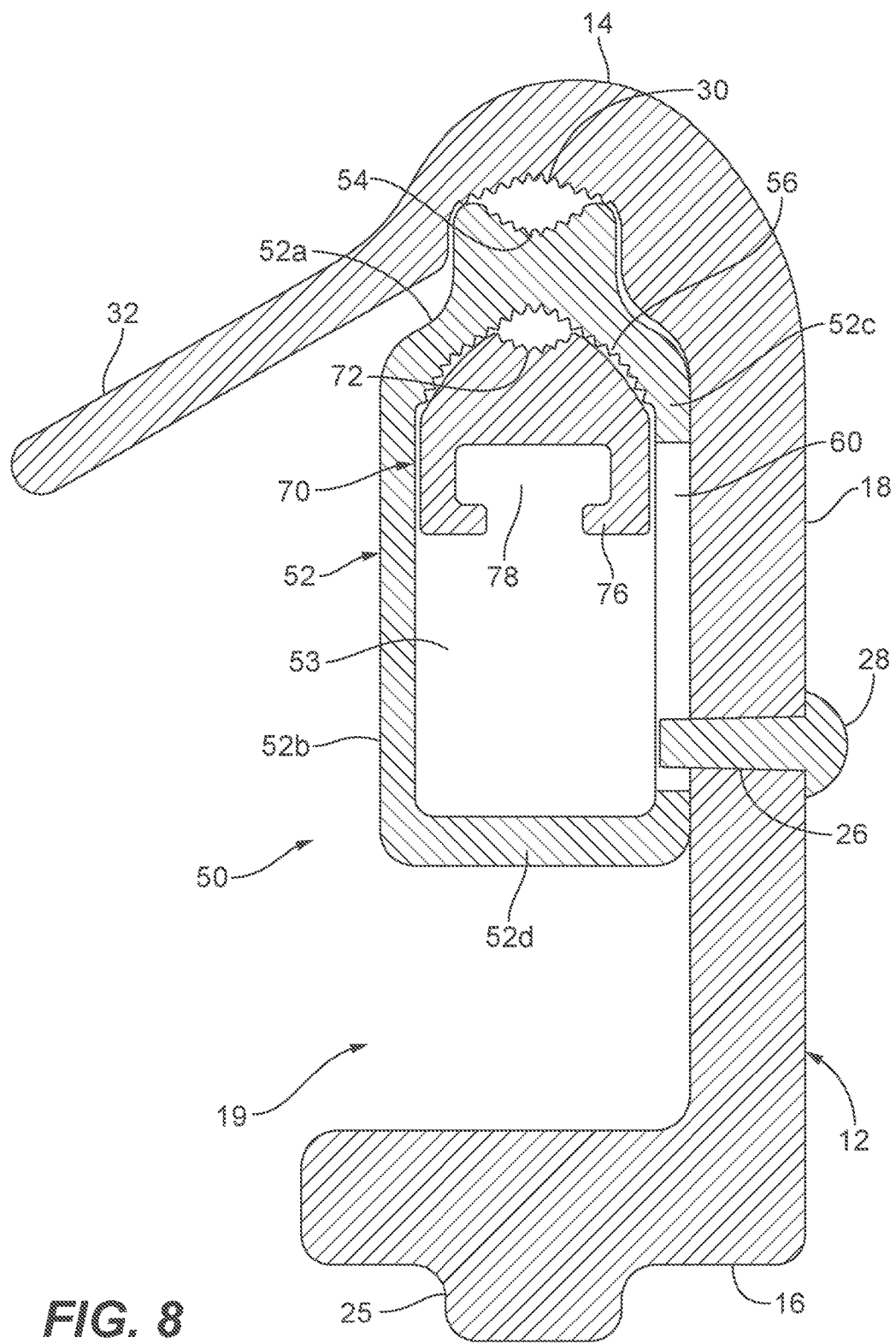
FIG. 8 is a cross sectional view of the cable clamp of FIG. 7 without a stem and taken along line 8-8.
Figure 9:
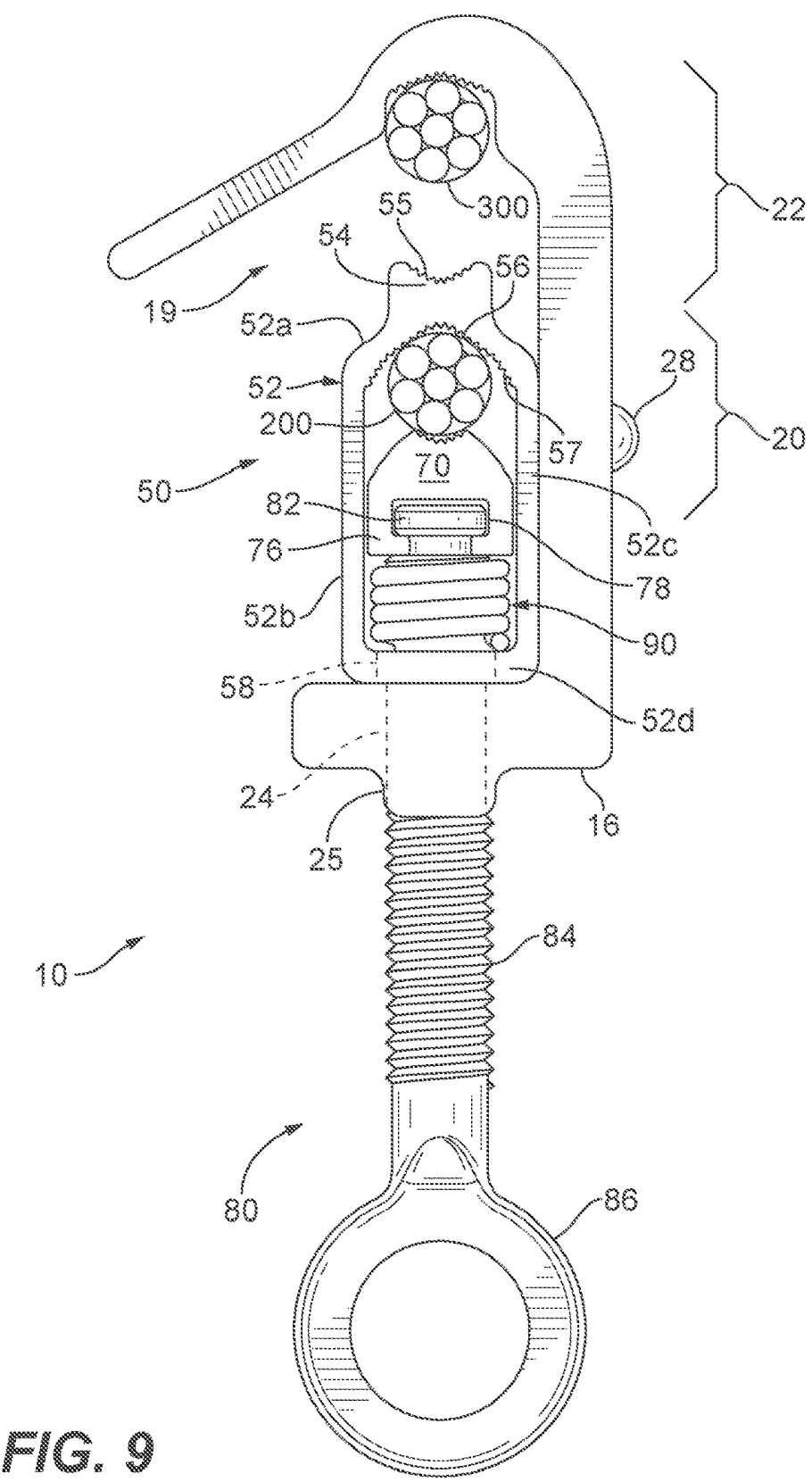
FIG. 9 is a side elevation view of the cable clamp of FIG. 1, illustrating a drop cable in the drop cable section of the cable clamp with the drop cable section in the clamping position, and a main span cable in the main span section of the cable clamp with the main span cable section in the open position.

Referring to FIGS. 2 and 6, the stem 80 is preferably an eye-stem that has a stem coupling member 82, a threaded shaft 84 and a tool mounting member 86 at an end of the shaft 84. The stem coupling member 82 is configured to couple with the keeper coupling member 78 so that the stem 80 can be coupled to the keeper 70. The stem coupling member 82 in the embodiment shown is a T-shaped member configured to fit within the T-shaped coupling channel 78 in the keeper 70. The tool mounting member 86 of the stem 80 is used to releasably couple the stem 80 to an extendable reach tool, such as for example, a hot stick. In the embodiment shown, the tool mounting member 86 is an eye or looped member. Coupling the stem 80 to the keeper 70 facilitates the translation of rotational movement of the stem 80 to linear movement of the keeper 70 within the spacer 50, which is used to move the spacer 50 within the body chamber 19.

The spring 90 is a conventional helical spring that fits around the threaded shaft 84 of the stem 80 between the keeper 70 and bottom wall 52d of the spacer 50 as shown in FIG. 2. The spring 90 normally biases the keeper 70 toward the top wall 52a of the spacer body 52 to temporarily clamp a drop cable positioned between the drop cable groove 56 in the top wall 52a of the spacer body 52 and the drop cable groove 72 in the keeper 70 within the clamp 10.

In the embodiment of FIGS. 1-8, the clamp body 12, spacer 50 and keeper 70 can be made of an electrically conductive material. Examples of suitable electrically conductive materials include, aluminum, cast aluminum, galvanized steel, and stainless steel. The stem 80 and spring 90 can be made of an electrically conductive material or a non-conductive material such as plastic or a composite material, e.g., carbon fiber.

Figure 11:
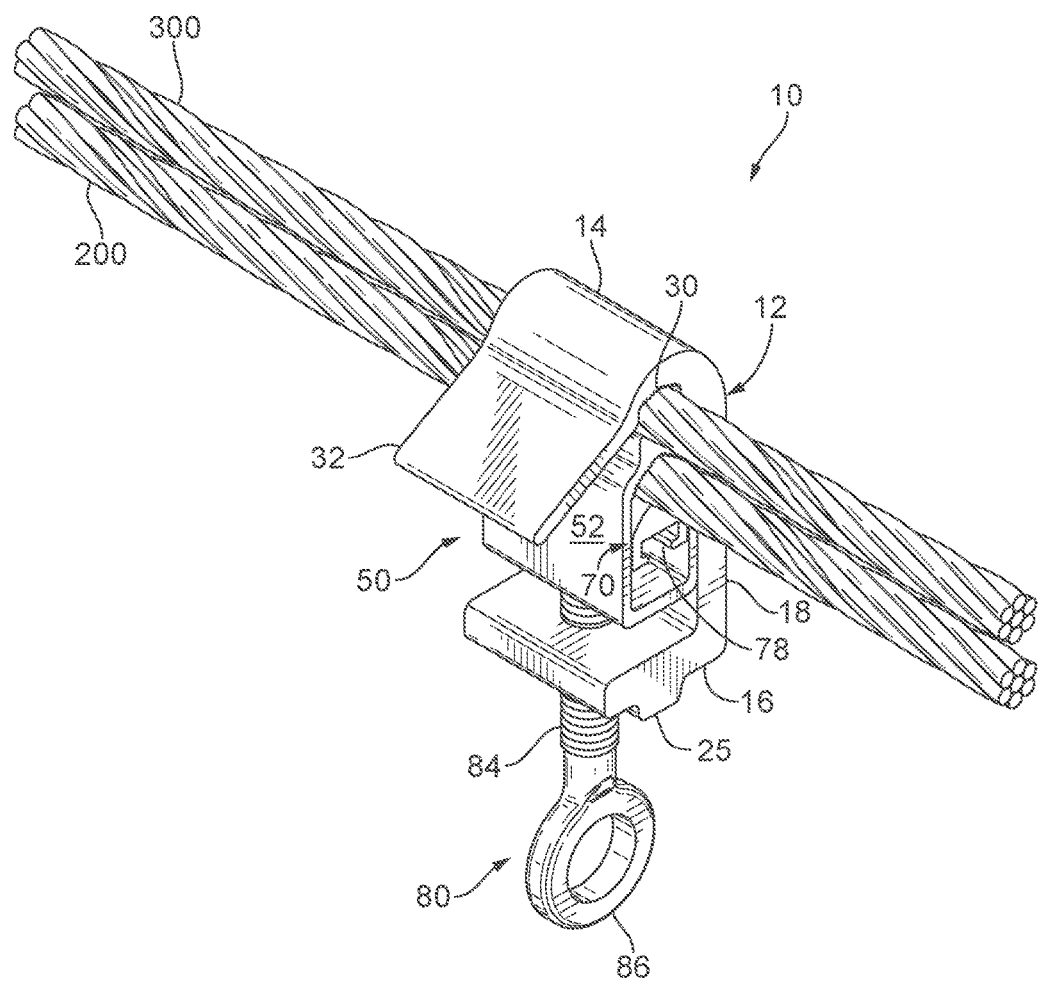
FIG. 11 is a perspective view of the cable clamp of FIG. 9, illustrating a main span cable in the main span cable section of the cable clamp with the main span cable section in the clamping position, and a drop cable in the drop cable section of the cable clamp with the drop cable section in the clamping position.
Figure 12:
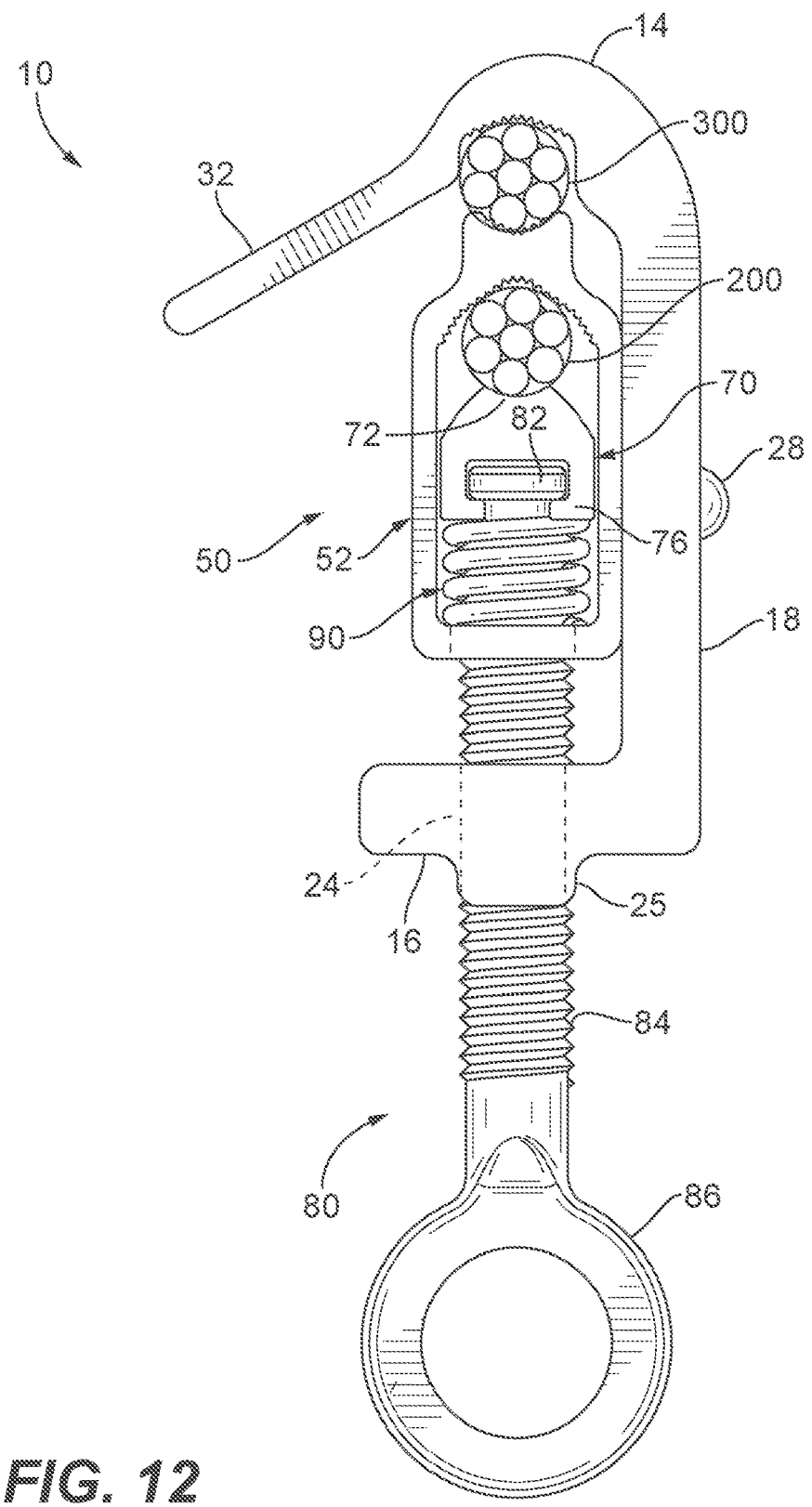
FIG. 12 is a side elevation view of the cable clamp of FIG. 11.
Figure 13:
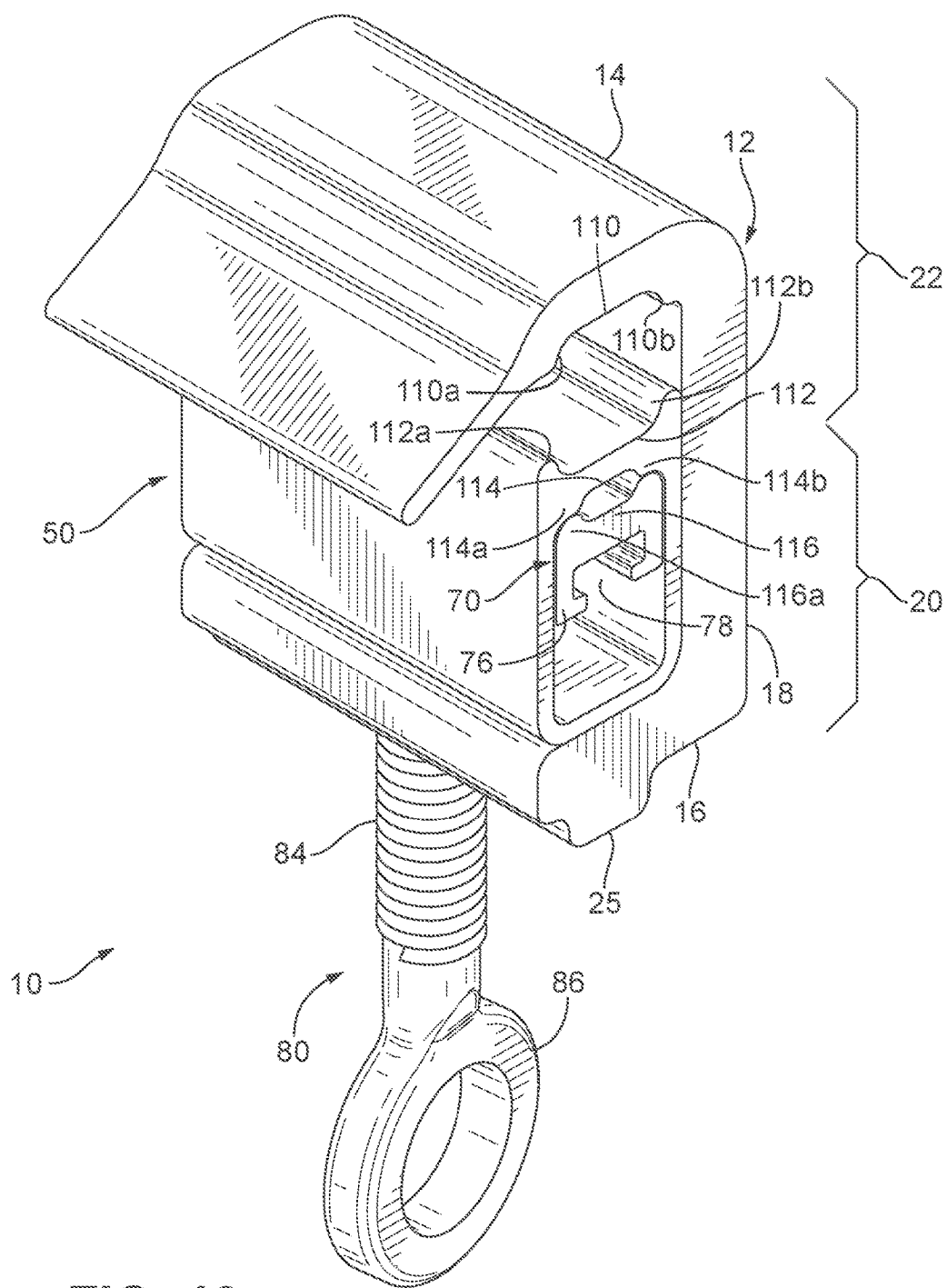
FIG. 13 is a perspective view of another exemplary embodiment of a cable clamp according to the present disclosure, illustrating a main span cable section in an open position and a drop cable section in a clamping position.
Figure 14:
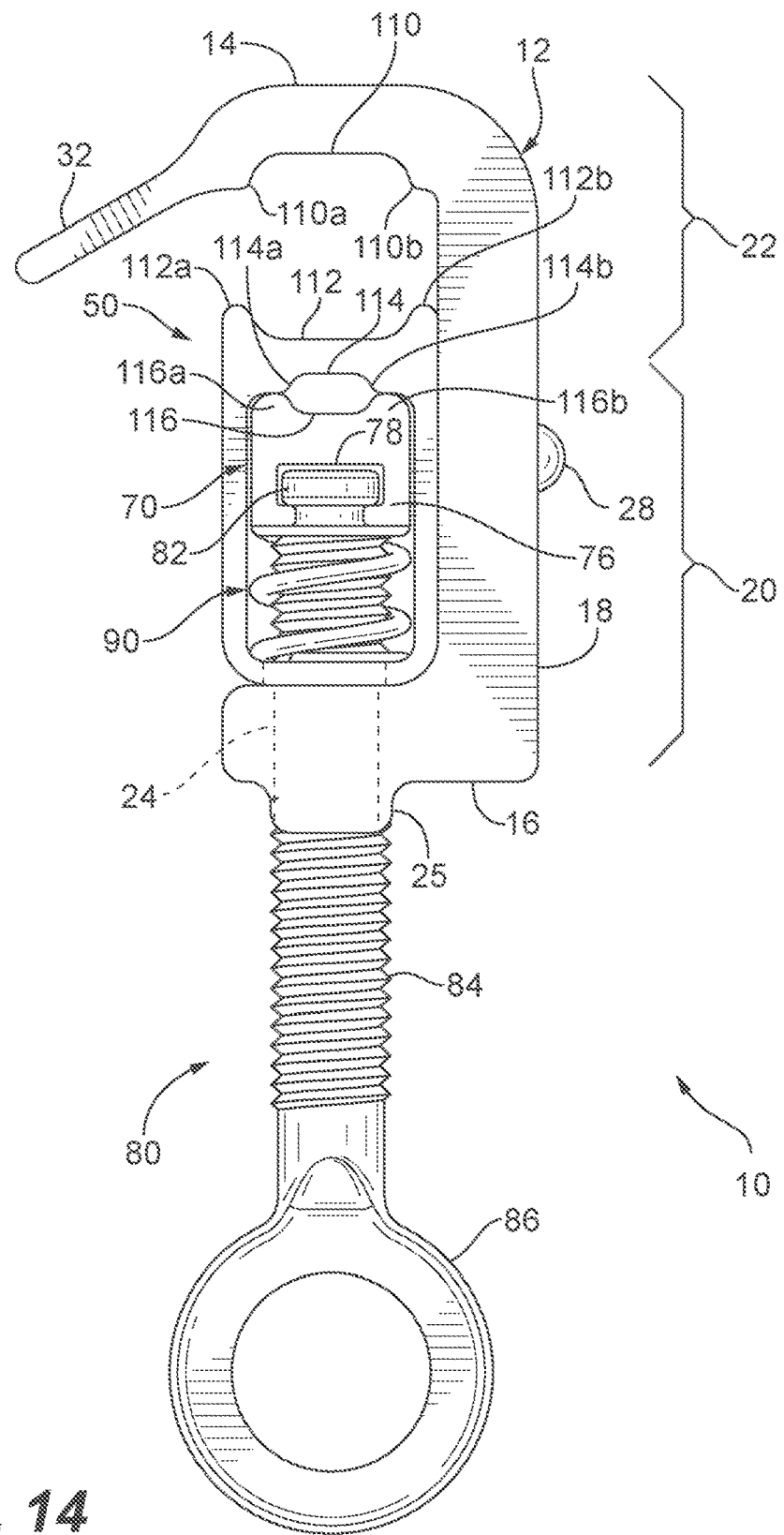
FIG. 14 is a side elevation view of the cable clamp of FIG. 13.
Figure 15:
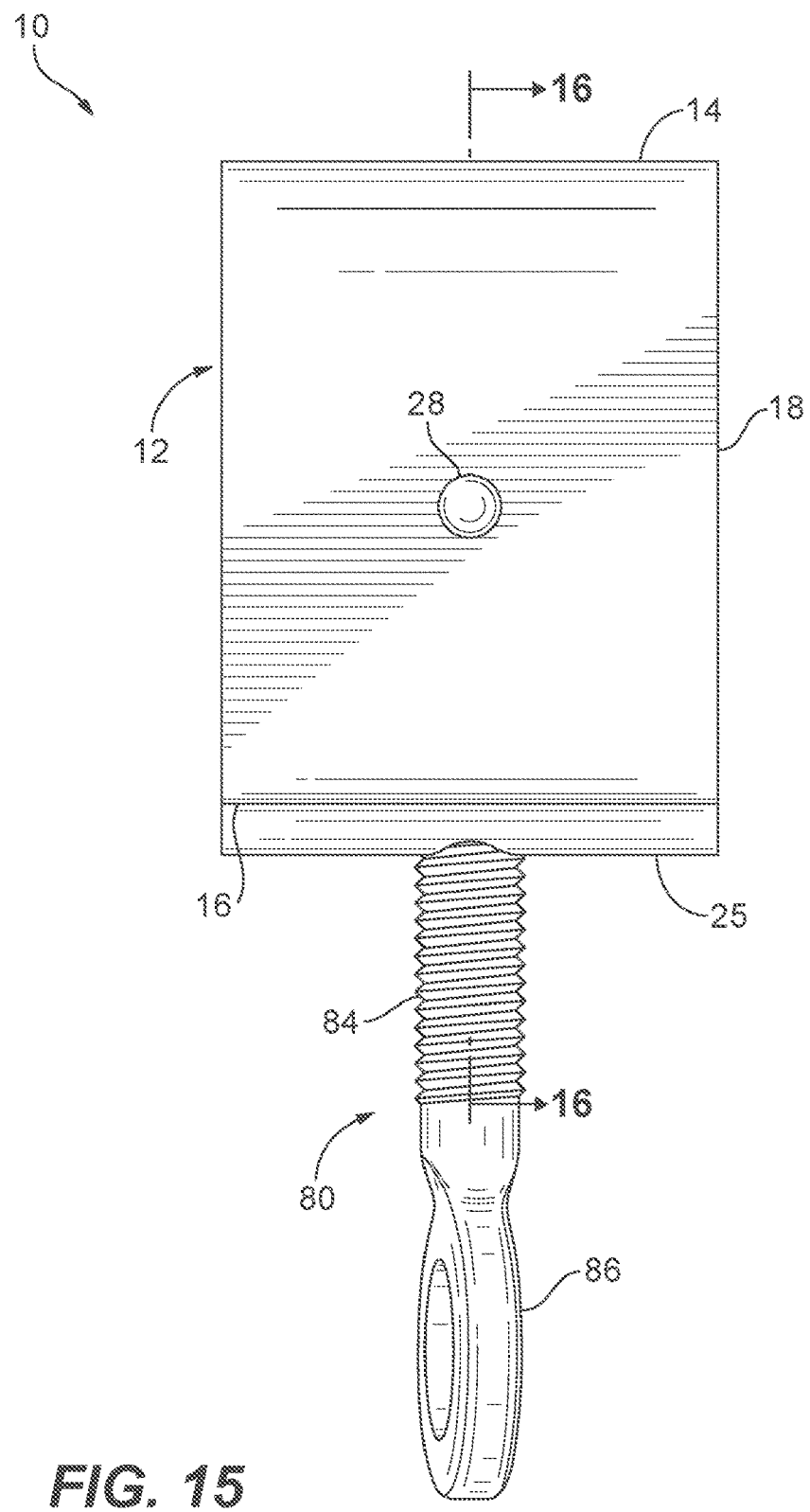
FIG. 15 is a rear elevation view of the cable clamp of FIG. 13.
Figure 16:
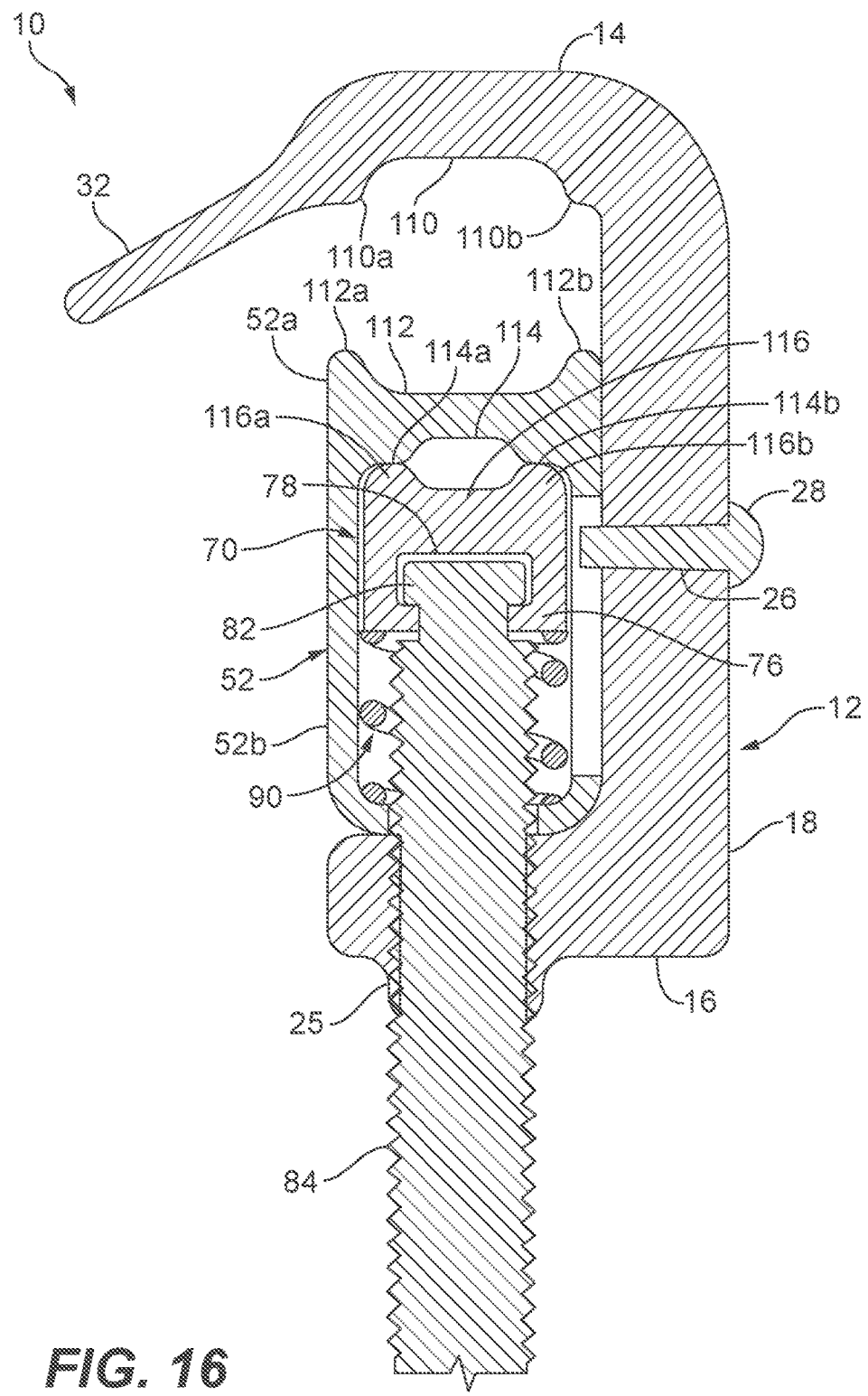
FIG. 16 is a cross sectional view of the cable clamp of FIG. 15 taken along line 16-16.
Figure 17:
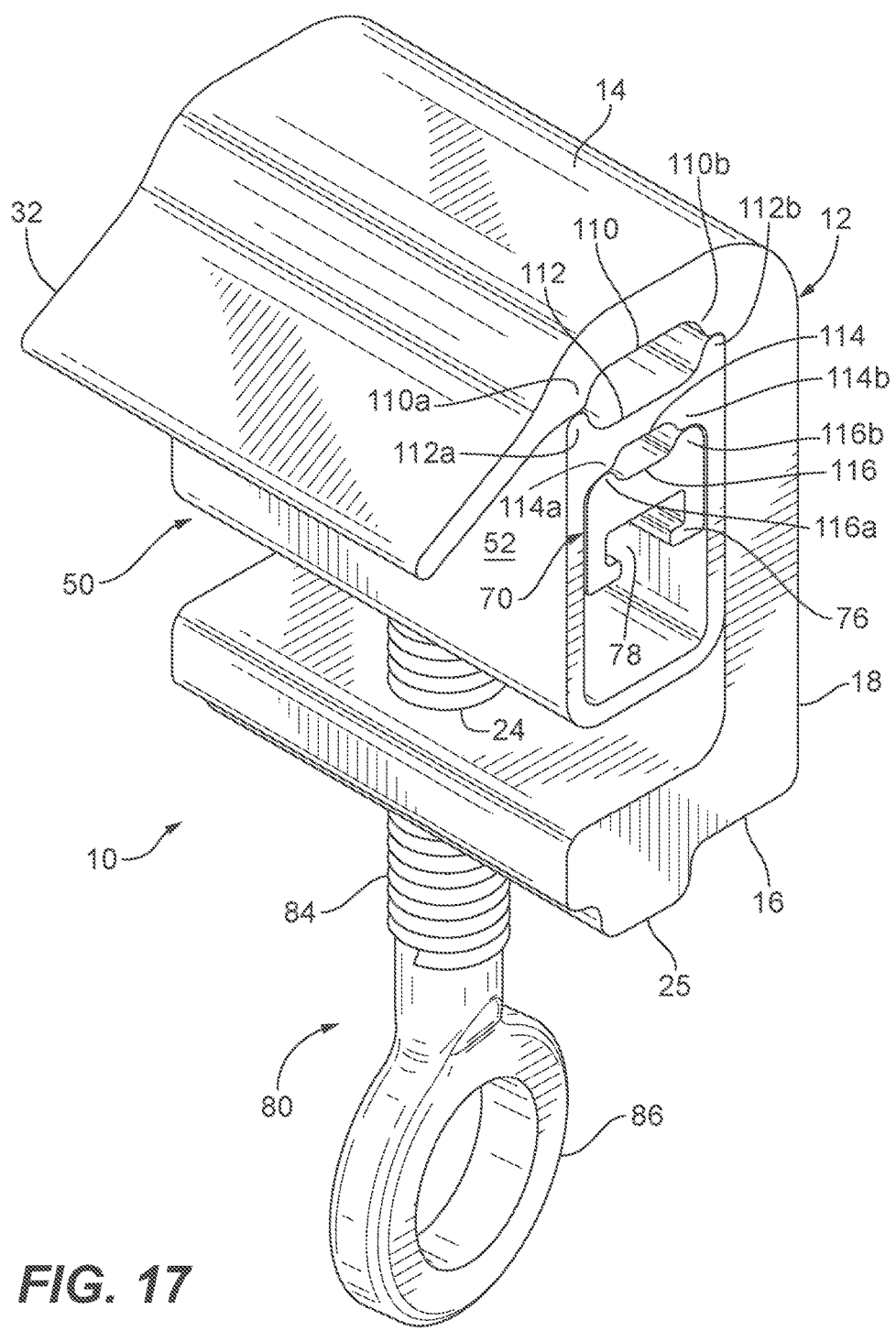
FIG. 17 is a perspective view of the cable clamp of FIG. 13, illustrating the main span cable section in a clamping position without a main span cable and the drop cable section in a clamping position without a drop cable.
Figure 18:
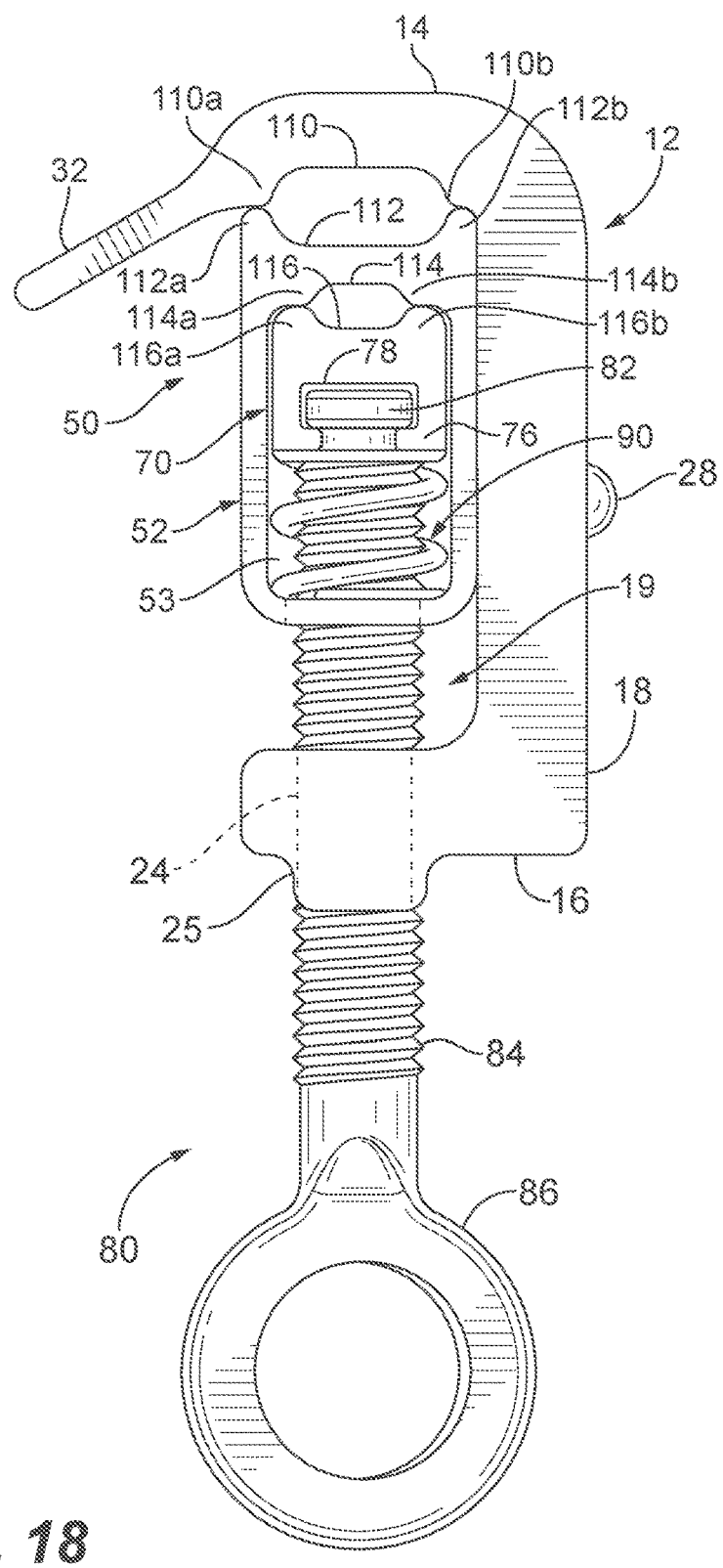
FIG. 18 is a side elevation view of the cable clamp of FIG. 17.
Figure 19:
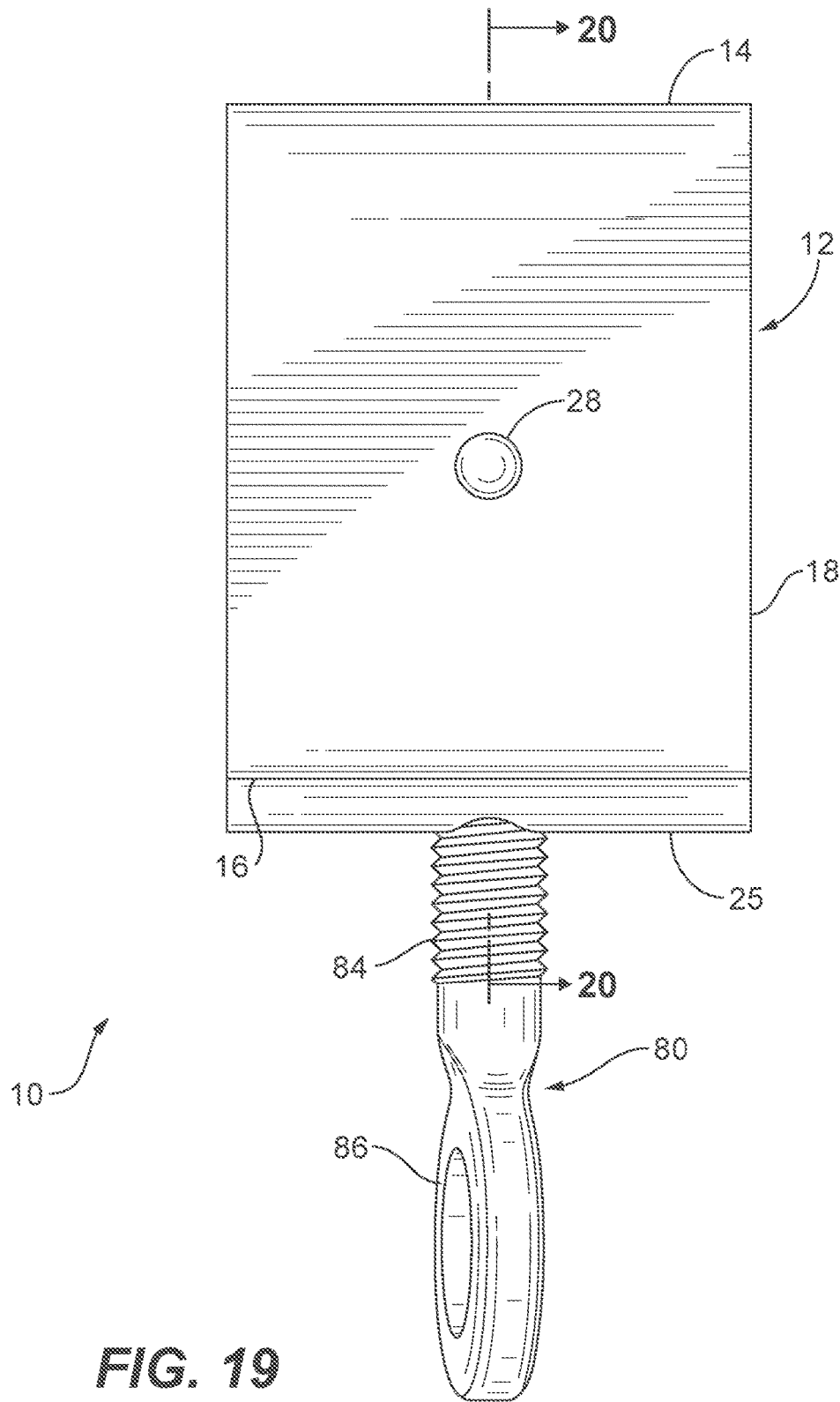
FIG. 19 is a rear elevation view of the cable clamp of FIG. 17.
Figure 20:
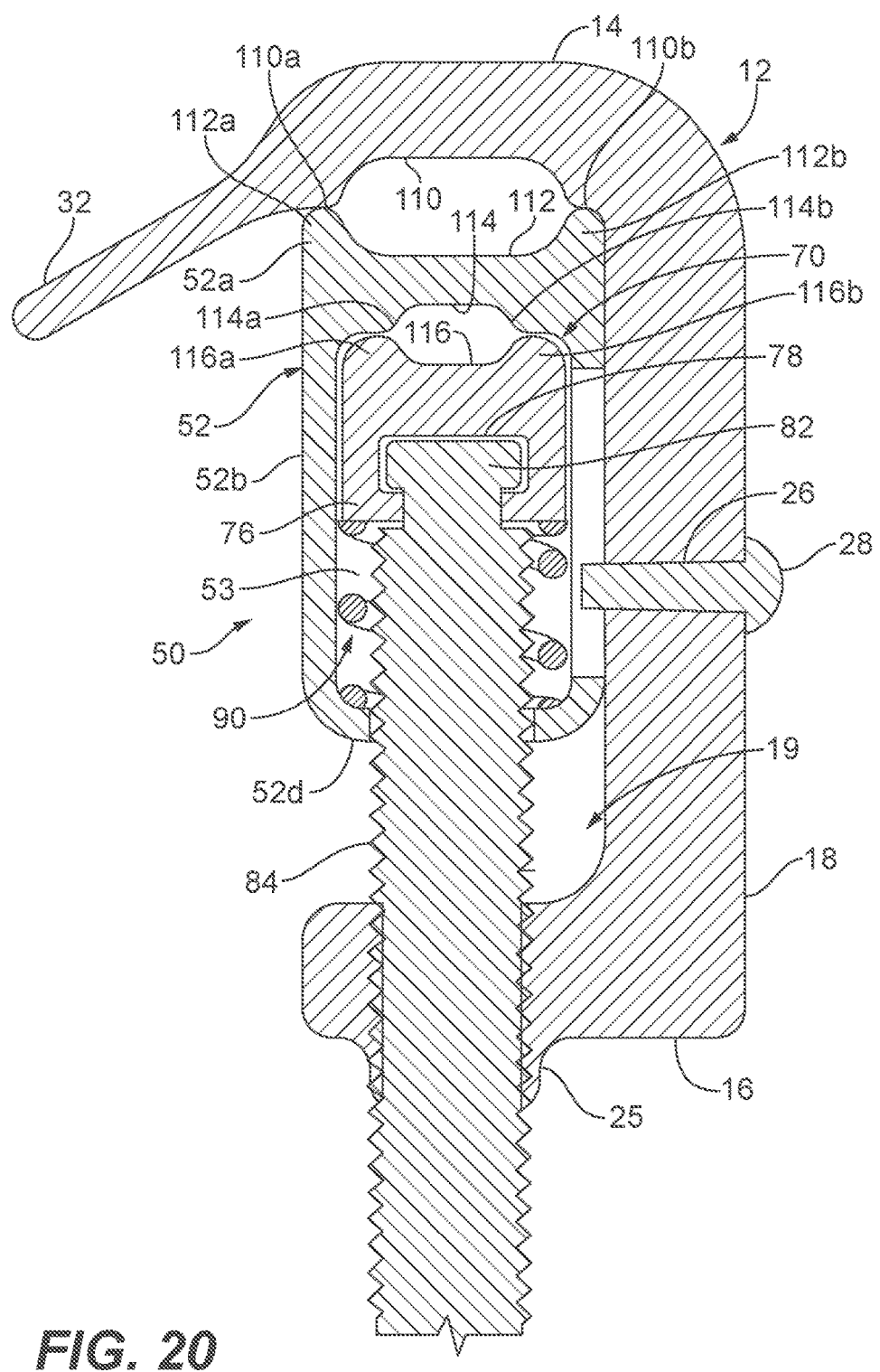
FIG. 20 is a cross sectional view of the cable clamp of FIG. 19 taken along line 20-20.

Referring now to FIGS. 2 and 9-12, to install the cable clamp 10 of the present disclosure a technician turns the stem 80 counter-clockwise to bring the spacer 50 and the keeper 70 toward the base 16 of the clamp body 12, as shown in FIG. 2, so that the drop cable section 20 and main span cable section 22 are in the open position and the spring 90 is compressed by the keeper 70. In this open position, the technician inserts a drop cable 200 into the drop cable section 20 of the clamp 10 and turns the stem 80 clockwise. Turing the stem 80 clockwise causes the keeper 70 to move linearly within the spacer 50 and incrementally decreases the force exerted by the keeper 70 on the spring 90. At a point where the force compressing the spring 90 ceases, the spring 90 biasing the keeper 70 toward the spacer so that a clamping force (i.e. a compression force) is exerted on the drop cable 200 between the keeper 70 and spacer 50 to hold the drop cable 200 in place within the clamp 10. The technician then couples the tool mounting member 86 of the stem 80 to an extendable reach tool, such as a hot stick, and extends the tool to install the clamp 10 onto the main span cable. The clamp 10 is installed onto the main span cable 300 by hooking the clamp 10 over the main span cable 300 until the main span cable 300 is seated in the main span cable groove 30 in clamp body 12, using the cable guide 32 on the clamp body 12 as a guide. The technician then advances the stem 80, i.e., rotates the stem clockwise, to advance the keeper 70, drop cable 200 and spacer 50 toward the cap 14 of the clamp body 12 so that the main span cable groove 54 in the spacer body 52 contacts the main span cable 300. The technician continues to advance the stem 80 to advance the keeper 70, drop cable 200, spacer 50 and main span cable 300 and torques the stem 80 to a recommended installation torque to tighten the main span cable 300 and drop cable 200 to the clamp 10 as shown in FIGS. 11 and 12.

Referring now to FIGS. 13-20, another exemplary embodiment of the cable clamp 10 according to the present disclosure is shown. In this embodiment, the clamp 10 includes a clamp body 12, a spacer 50, a keeper 70, a stem 80 and a spring 90. The stem 80 and spring 90 are the same as the stem and spring described above, and for ease of description are not repeated. Further, the clamp body 12, spacer 50 and keeper 70 are substantially the same as the clamp body, spacer and keeper described above, and for ease of description the common components are not repeated. The difference between the embodiment of FIGS. 1-12 and the embodiment of FIG. 13-24 is the shape of the drop cable grooves and the main span cable grooves and the materials the clamp body 12, a spacer 50, a keeper 70, a stem 80 and a spring 90 can be made of.

Figure 21:
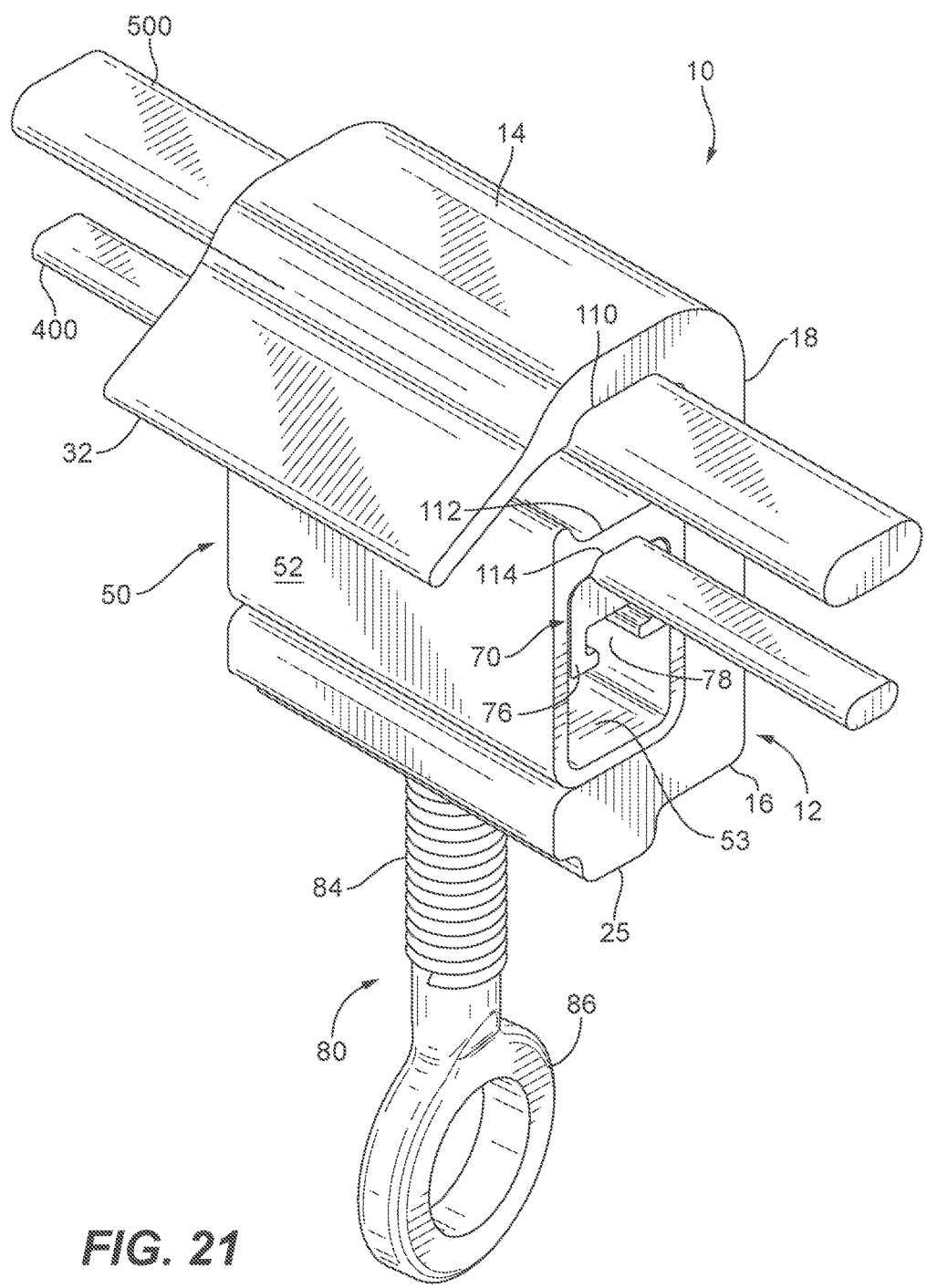
FIG. 21 is a perspective view of the cable clamp of FIG. 13, illustrating a main span cable in the main span cable section with the main span cable section in the open position, and a drop cable in the drop cable section with the drop cable section in the clamping position.
Figure 22:
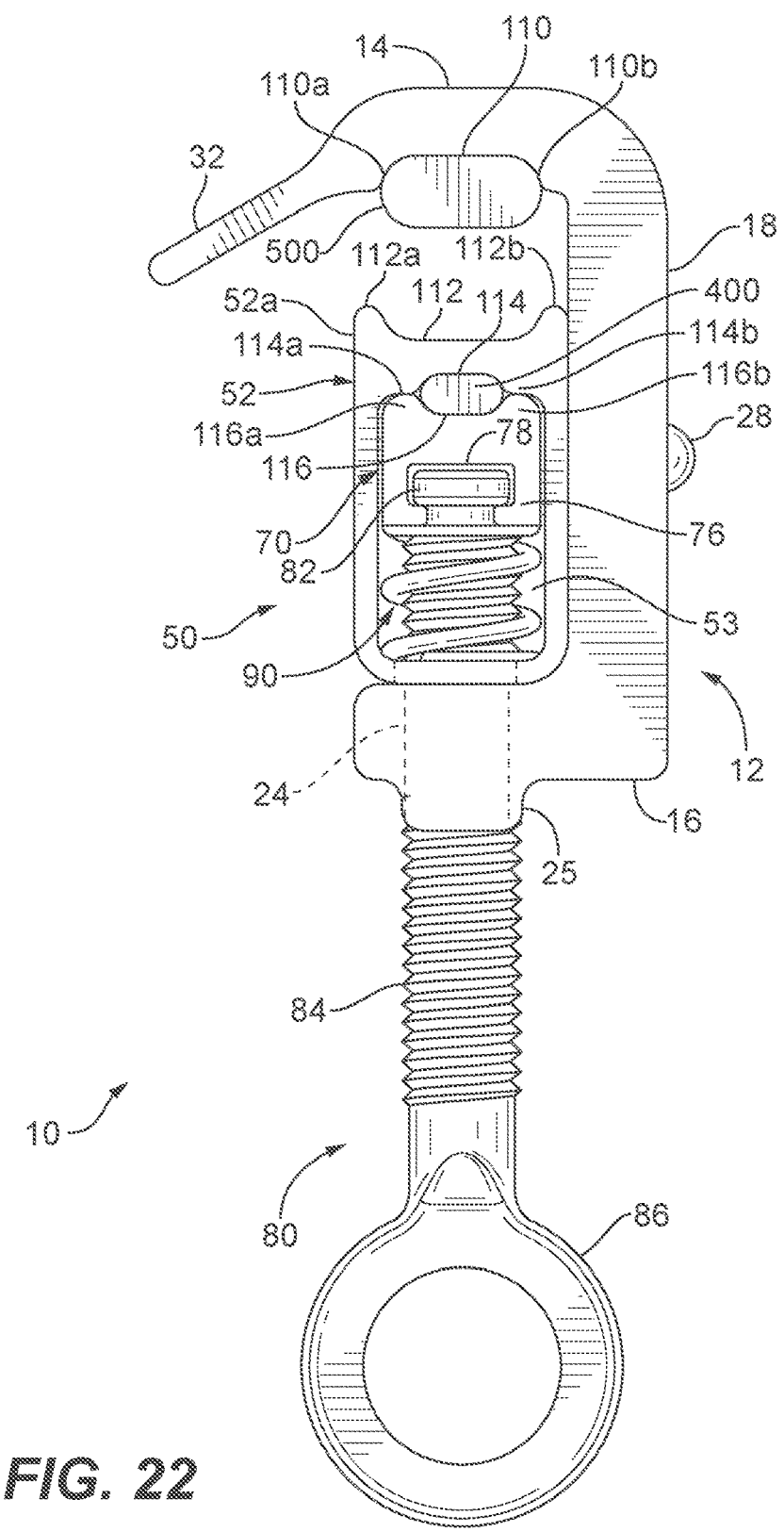
FIG. 22 is a side elevation view of the cable clamp of FIG. 21.

In this embodiment, the cable grooves are shaped to clamp cables that have, for example, a rectangular like shape with rounded corners or rounded edges. As an example, certain fiber optic cables have a rectangular like shape with rounded corners as seen in FIG. 21. More specifically, the clamp body 12 includes a main span cable groove 110 that is substantially flat with rounded corners and configured to receive a cable having a similar shape, such as certain fiber optic cables 500. The spacer 50 includes a main span cable groove 112 and a drop cable groove 114 that are substantially flat with rounded corners and configured to receive a cable having a similar shape, such as certain fiber optic cables, e.g., drop cable 400. The keeper 70 includes a drop cable groove 116, seen in FIG. 13, that is substantially flat with rounded corners and configured to receive a cable having a similar shape, such as certain fiber optic cables, such as drop cable 400.

In the embodiment of FIGS. 13-20, the clamp body 12, spacer 50 and keeper 70 can be made of an electrically conductive material. Examples of suitable electrically conductive materials include aluminum, cast aluminum, galvanized steel, and stainless steel. The stem 80 and spring 90 can be made of an electrically conductive material or a non-conductive material such as plastic or a composite material, e.g., carbon fiber. In another embodiment, the clamp body 12, spacer 50 and keeper 70 can be made of a non-conductive material such as plastic or a composite material, e.g., carbon fiber.

Figure 23:
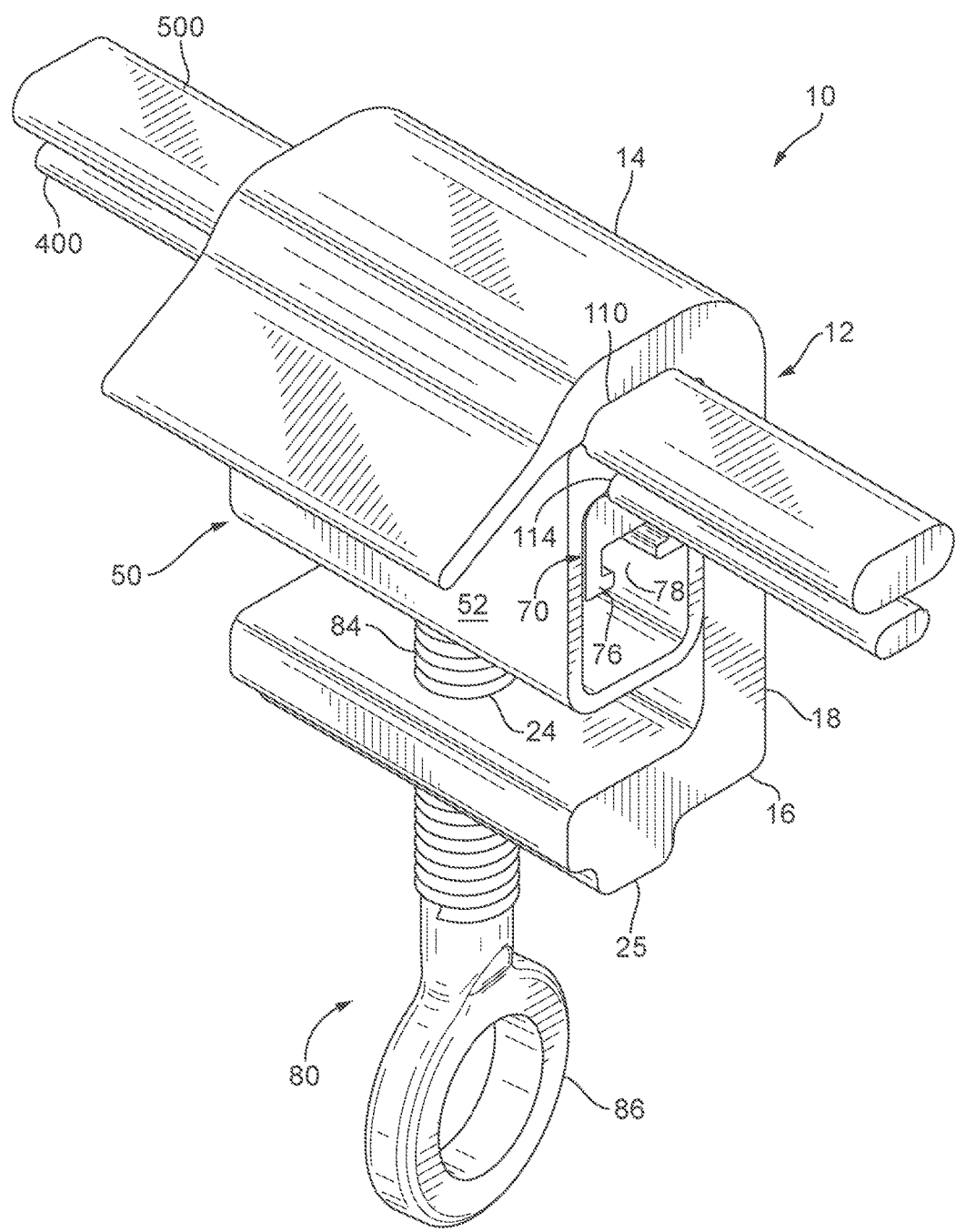
FIG. 23 is a perspective view of the cable clamp of FIG. 13, illustrating a main span cable in the main span cable section with the main span cable section in the clamping position, and a drop cable in the drop cable section with the drop cable section in the clamping position.
Figure 24:
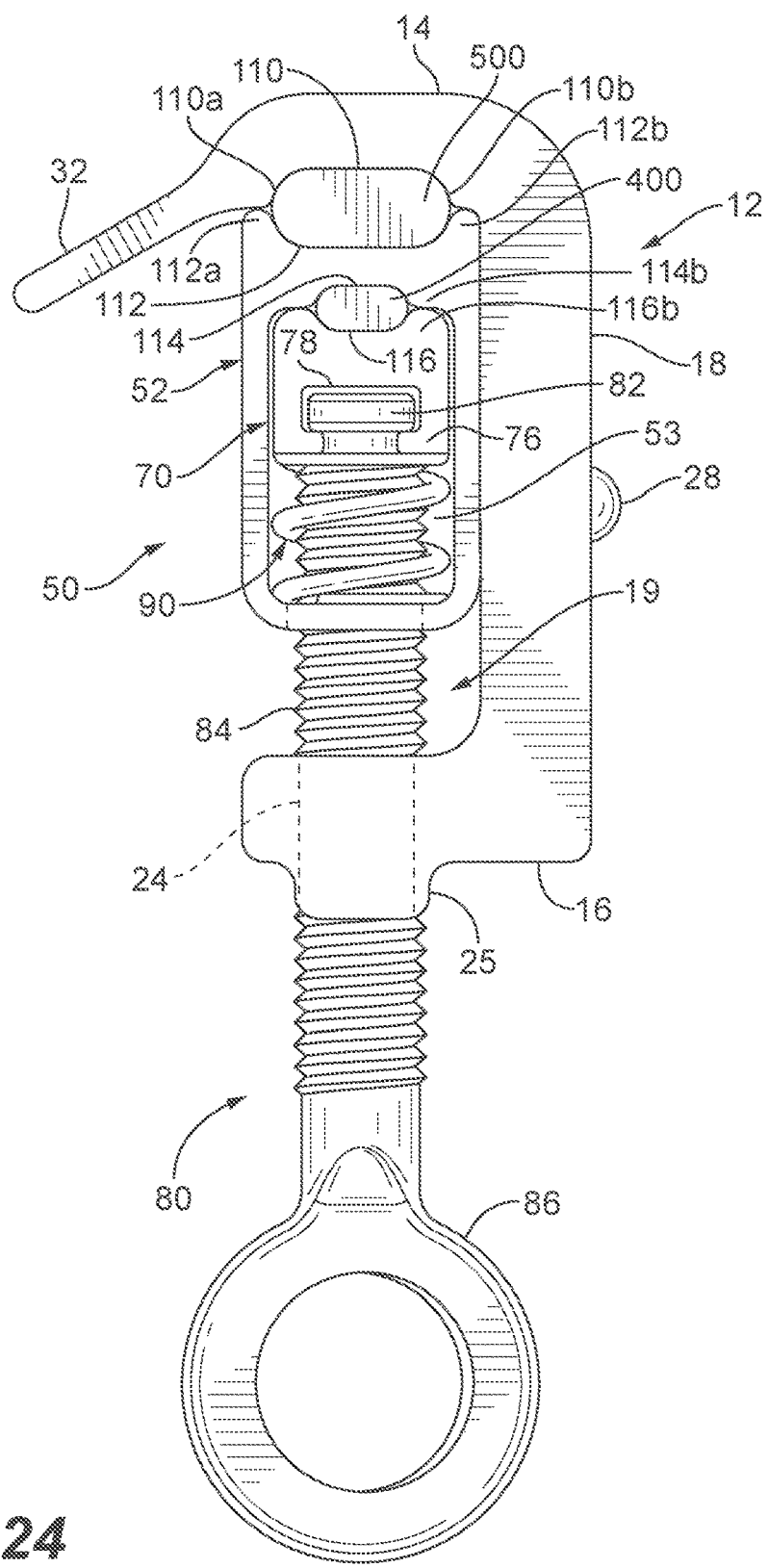
FIG. 24 is a side elevation view of the cable clamp of FIG. 23.

Referring to FIGS. 21-24, to install the cable clamp 10 of the present disclosure, a technician turns the stem 80 counter-clockwise to bring the spacer 50 and the keeper 70 toward the base 16 of the clamp body 12, so that the drop cable section 20 and main span cable section 22 are in the open position and the spring 90 is compressed by the keeper 70. In this open position, the technician inserts a drop cable 400 into the drop cable section 20 of the clamp 10 and turns the stem 80 clockwise. Turing the stem 80 clockwise causes the keeper 70 to move linearly within the spacer 50 and incrementally decreases the force exerted by the keeper 70 on the spring 90. At a point where the force compressing the spring 90 ceases, the spring 90 biasing the keeper 70 toward the spacer 50 so that a clamping force (i.e. a compression force) is exerted on the drop cable 400 between the keeper 70 and spacer 50 to hold the drop cable 400 in place within the clamp 10. The technician then couples the tool mounting member 86 of the stem 80 to an extendable reach tool, such as a hot stick, and extends the tool to install the clamp 10 onto the main span cable 500. The clamp 10 is installed onto the main span cable 500 by hooking the clamp 10 over the main span cable until the main span cable 500 is seated in the main span cable groove 110 in clamp body 12, using the cable guide 32 on the clamp body 12 as a guide. The technician then advances the stem 80, i.e., rotates the stem clockwise, to advance the keeper 70, drop cable 400 and spacer 50 toward the cap 14 of the clamp body 12 so that the main span cable groove 112 in the spacer body 52 contacts the main span cable 500. The technician continues to advance the stem 80 to advance the keeper 70, drop cable 400, spacer 50 and main span cable 500 and torques the stem 80 to a recommended installation torque to tighten the main span cable 500 and drop cable 400 to the clamp 10, as shown in FIGS. 23 and 24. It is noted that the main span cable grooves 110 and 112 are configured so that when the spacer 50 is in the clamping position relative to the clamp body 12, ribs 112a and 112b on the main span cable groove 112 contact the edges 110a and 110b, respectively, associated with the drop cable groove 110 preventing the exertion of excessive force to the main span cable and thus preventing crushing and possibly damaging the main span cable 500 no matter how much torque is applied to the stem 80. Similarly, the drop cable grooves 114 and 116 are configured so that when the keeper 70 is in the clamping position relative to the spacer 50, ribs 116a and 116b on the drop cable groove 116 contact the edges 114a and 114b, respectively, associated with the drop cable groove 114 preventing the exertion of excessive force to the drop cable, and thus preventing crushing and possibly damaging the drop cable 400 no matter how much torque is applied to the stem 80.

While exemplary embodiments have been chosen to illustrate the invention, it will be understood by those skilled in the art that various changes, modifications, additions, and substitutions are possible, without departing from the scope and spirit of the invention.

What is claimed is:

1. A cable clamp comprising:
    a clamp body having a cap, a base and wall between the cap and base, wherein the cap, base and wall form a cavity, and wherein the cap includes a first main span cable groove;
    a spacer having a spacer body movably mounted within the cavity, the spacer body having a hollow center and a top wall with a second main span cable groove that faces the first main span cable groove, and a first drop cable groove;
    a keeper positioned within the hollow center of the spacer body and movable within the hollow center, the keeper having a second drop cable groove that faces the first drop cable groove and a keeper coupling member;
    a stem having a stem coupling member at one end of a threaded shaft and a tool mounting member at the other end of the threaded shaft, the threaded shaft being positioned within a threaded aperture in the clamp body so that the stem coupling member is coupled to the keeper coupling member such that rotational movement of the stem is translated to linear movement of the keeper; and
    a spring positioned around the threaded shaft of the stem within the hollow center of the spacer between the keeper and the spacer body, wherein the spring normally biases the second drop cable groove toward the first drop cable groove.

2. The cable clamp according to claim 1, wherein the second main span groove has at least one rib that can contact an edge of the cap to limit the compression force that can be applied by the spacer against the edge of the cap.

3. The cable clamp according to claim 1, wherein the second drop groove has at least one rib that can contact an edge of the top wall of the spacer body to limit the compression force that can be applied by the keeper against the edge of the top wall of the spacer body.

4. The cable clamp according to claim 1, wherein the cap, base and wall form a C-shape.

5. The cable clamp according to claim 1, wherein the keeper coupling member is a T-shaped channel.

6. The cable clamp according to claim 5, wherein the stem coupling member is a T-shaped member that couples to the T-shaped channel.

7. The cable clamp according to claim 1, wherein the first main span cable groove includes a plurality of teeth.

8. The cable clamp according to claim 1, wherein the second main span cable groove includes a plurality of teeth.

9. The cable clamp according to claim 1, wherein the first drop cable groove includes a plurality of teeth.

10. The cable clamp according to claim 1, wherein the second drop cable groove includes a plurality of teeth.

11. The cable clamp according to claim 1, wherein the clamp body further comprises a cable guide.

12. The cable clamp according to claim 11, wherein the cable guide extends from the cap.

13. The cable clamp according to claim 1, wherein the first main span cable groove is shaped to receive a round type cable.

14. The cable clamp according to claim 1, wherein the first main span cable groove is shaped to receive a rectangular type cable.

15. The cable clamp according to claim 1, wherein the second main span cable groove is shaped to receive a round type cable.

16. The cable clamp according to claim 1, wherein the second main span cable groove is shaped to receive a rectangular type cable.

17. The cable clamp according to claim 1, wherein the first drop cable groove is shaped to receive a round type cable.

18. The cable clamp according to claim 1, wherein the first drop cable groove is shaped to receive a rectangular type cable.

19. The cable clamp according to claim 1, wherein the second drop cable groove is shaped to receive a round type cable.

20. The cable clamp according to claim 1, wherein the second drop cable groove is shaped to receive a rectangular type cable.

* * * * *